(12) United States Patent
Hirsch

(10) Patent No.: US 9,575,567 B2
(45) Date of Patent: Feb. 21, 2017

(54) KEYBOARD AND KEYS

(71) Applicant: Steven B. Hirsch, Middleburg, VA (US)

(72) Inventor: Steven B. Hirsch, Middleburg, VA (US)

(*) Notice: Subject to any disclaimer, the term of this patent is extended or adjusted under 35 U.S.C. 154(b) by 0 days.

(21) Appl. No.: 14/286,755

(22) Filed: May 23, 2014

(65) Prior Publication Data

US 2015/0130721 A1    May 14, 2015

Related U.S. Application Data

(63) Continuation-in-part of application No. 11/557,045, filed on Nov. 6, 2006, now Pat. No. 8,734,036, which is a continuation-in-part of application No. 10/650,825, filed on Aug. 29, 2003, now Pat. No. 7,131,780.

(60) Provisional application No. 60/750,806, filed on Dec. 16, 2005, provisional application No. 60/733,184, filed on Nov. 4, 2005.

(51) Int. Cl.
| | |
|---|---|
| *B41J 5/10* | (2006.01) |
| *G06F 3/02* | (2006.01) |
| *G06F 1/16* | (2006.01) |
| *G06F 3/023* | (2006.01) |
| *G06F 3/0488* | (2013.01) |

(52) U.S. Cl.
CPC .............. *G06F 3/0202* (2013.01); *B41J 5/10* (2013.01); *G06F 1/1662* (2013.01); *G06F 1/1671* (2013.01); *G06F 3/0219* (2013.01); *G06F 3/0234* (2013.01); *G06F 3/04886* (2013.01); *G06F 2203/04809* (2013.01)

(58) Field of Classification Search
CPC .................. B41J 5/10; B41J 5/12; B41J 5/28; B41J 15/105; G06D 3/0202; G06D 1/662; G06D 1/1671; G06D 3/0219; G06D 3/0234; G06D 3/04886; G06D 2203/04809
See application file for complete search history.

(56) References Cited

U.S. PATENT DOCUMENTS

| | | | | |
|---|---|---|---|---|
| 1,652,434 | A * | 12/1927 | George et al. | 404/106 |
| 4,449,839 | A * | 5/1984 | Bleuer | 400/485 |
| 5,525,235 | A * | 6/1996 | Chen et al. | 210/641 |
| 6,348,878 | B1 * | 2/2002 | Tsubai | 341/23 |
| 2003/0193478 | A1* | 10/2003 | Ng et al. | 345/168 |
| 2004/0190968 | A1* | 9/2004 | Yang | 400/472 |
| 2005/0123333 | A1* | 6/2005 | Sugimura et al. | 400/485 |

\* cited by examiner

*Primary Examiner* — Jill Culler
*Assistant Examiner* — Marissa Ferguson Samreth
(74) *Attorney, Agent, or Firm* — Fitch, Even, Tabin & Flannery LLP; Stephen S. Favakeh

(57) ABSTRACT

In a preferred form, a keyboard has a single row of eight multi-position keys with the letters arranged in a standard QWERTY keyboard configuration. The eight keys correspond to the eight fingers used when touch typing; each finger operates one key, and that key contains all the letters that the finger normally accesses when touch typing on a standard QWERTY keyboard. With this design, no finger has to move to a different key while typing. When depressed at different locations on its key face, each key either moves straight down, or down while tilting slightly about one of a plurality of axes. Three-position keys have two tilt axes and six-position keys have five tilt axes. The keys utilize contacts located on the bottom of the keys which may be conductive or nonconductive.

29 Claims, 36 Drawing Sheets

Foot Heights

Foot Numbers

|  | | Letter | | | | | | | |
|---|---|---|---|---|---|---|---|---|---|
| Foot Number | | J | J | J | J | U | M | H | Y | N |
| | 1-2 | 0 | 0 | 0 | 0 | 1 | 0 | 0 | X | 0 |
| | 2-3 | 1 | 1 | 1 | X | X | 0 | X | 0 | 0 |
| | 3-3 | 1 | 1 | X | 1 | X | 0 | 0 | 0 | 0 |
| | 4-3 | 1 | X | 1 | 1 | 0 | X | X | 0 | 0 |
| | 5-3 | X | 1 | 1 | 1 | 0 | X | 0 | 0 | 0 |
| | 6-2 | 0 | 0 | 0 | 0 | 0 | 1 | 0 | 0 | X |
| | 7-1 | 0 | 0 | 0 | 0 | 0 | 0 | 0 | 1 | 0 |
| | 8-2 | 0 | 0 | 0 | 0 | 0 | 0 | 1 | X | 0 |
| | 9-2 | 0 | 0 | 0 | 0 | 0 | 0 | 1 | 0 | X |
| | 10-1 | 0 | 0 | 0 | 0 | 0 | 0 | 0 | 0 | 1 |

1 = required contact
0 = required no contact
X = don't care

Fig. 6

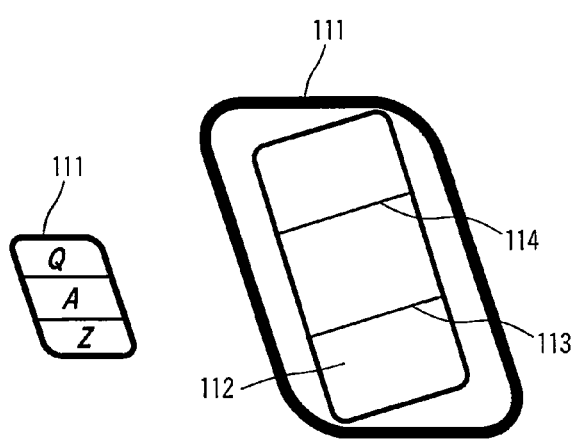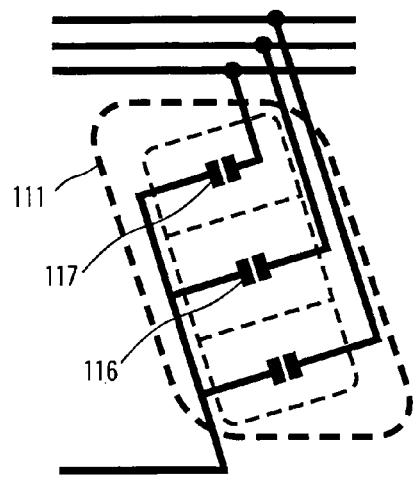
Fig. 11    Fig. 11d
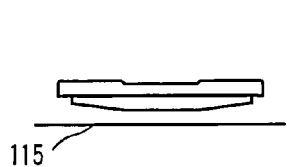 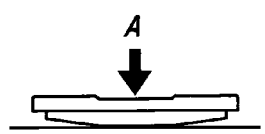 
Fig. 11a    Fig. 11b    Fig. 11c

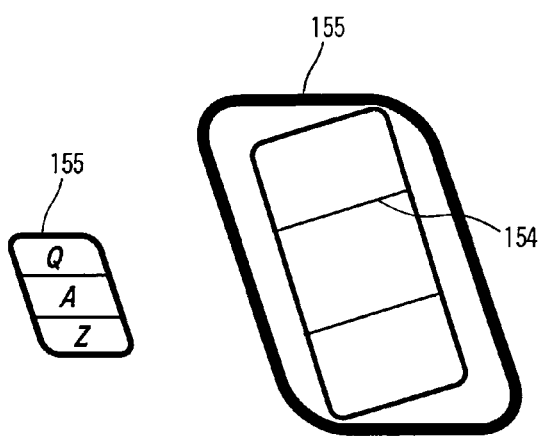
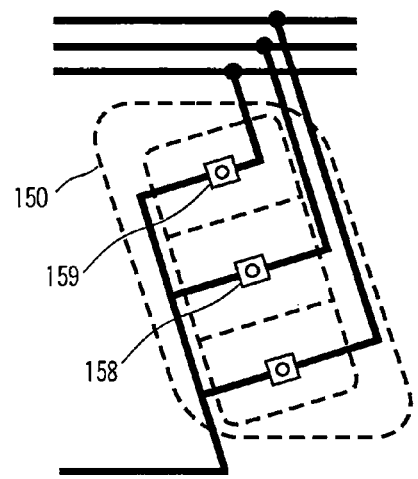
Fig. 15
Fig. 15d
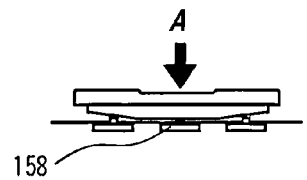
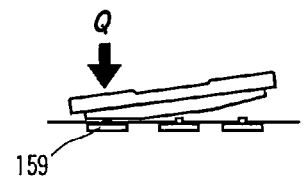
Fig. 15a
Fig. 15b
Fig. 15c German "QWERTZ"

German "QWERTZ"

French "AZERTY"

French "AZERTY"

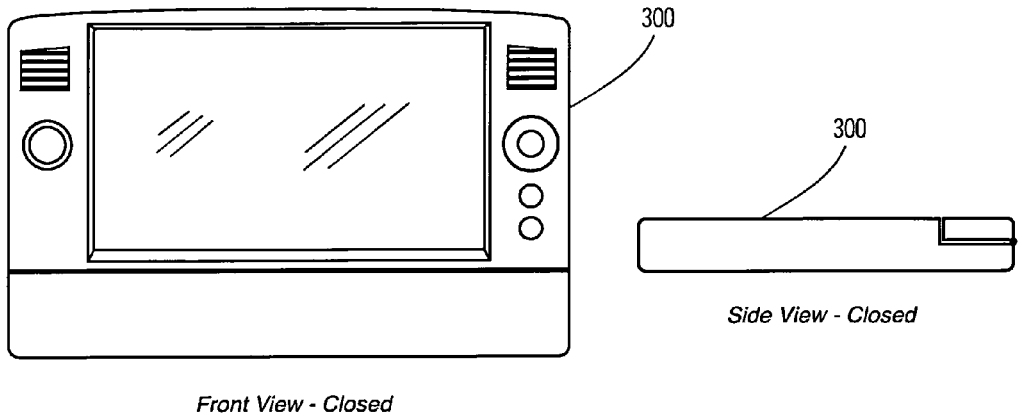
Front View - Closed
Fig. 30a
Side View - Closed
Fig. 30b
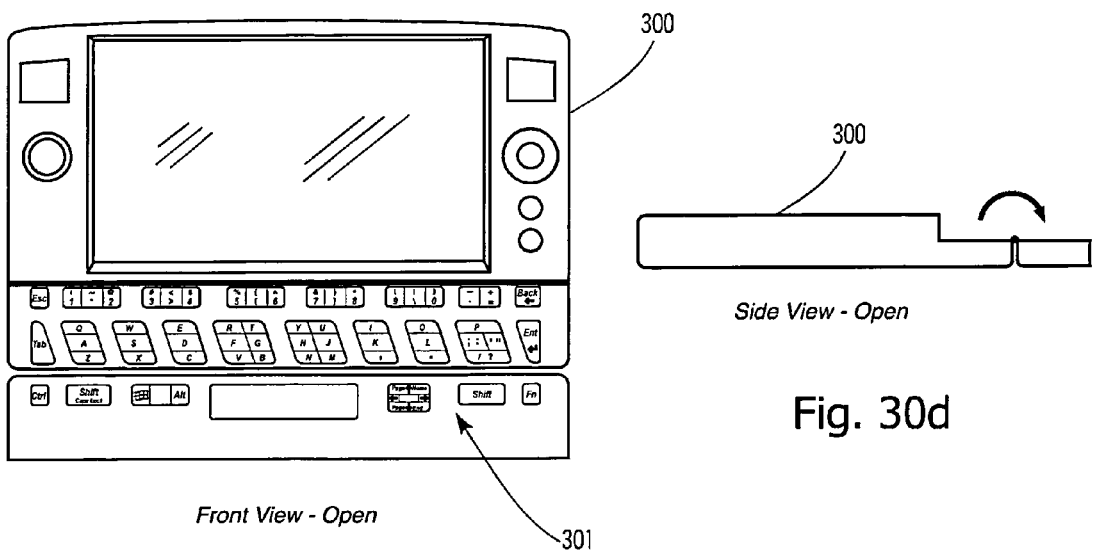
Front View - Open
Fig. 30c
Side View - Open
Fig. 30d

KEYBOARD AND KEYS

CROSS REFERENCE TO RELATED APPLICATIONS

This application is a continuation in part of U.S. patent application Ser. No. 11/557,045, filed Nov. 6, 2006, which is a continuation-in-part of U.S. patent application Ser. No. 10/650,825, filed Aug. 29, 2003, now U.S. Pat. No. 7,131, 780, and the prior U.S. patent application Ser. No. 11/557, 045 also claims the benefit of U.S. Provisional Application 60/750,806, filed Dec. 16, 2005, and U.S. Provisional Application 60/733,184, filed Nov. 4, 2005, which are all hereby incorporated by reference herein in their entirety.

FIELD OF THE INVENTION

The present invention is directed to a keyboard which may be used for a full-size computer keyboard, a laptop, notebook or tablet computer keyboard, a personal digital assistant (PDA) device keyboard, a smart display keyboard, a pocket translator or dictionary keyboard, or other device which utilizes an alphanumerical keyboard. The keyboard comprises an input device for any data or any information desired for any type of keyboard-compatible device. The keyboard more specifically relates to the standard QWERTY keyboard configuration which is most often used in touch typing. However, the keyboard configuration is not limited to the standard QWERTY keyboard layout. The invention considers the dexterity of the index fingers and other fingers used in touch typing.

BACKGROUND OF THE INVENTION

The standard QWERTY keyboard arrangement of letters is well known in the art. In accordance with standard QWERTY design, one key is used for each letter of the alphabet, as well as separate keys for numbers and other punctuation marks. In the use of such keyboards, the fingers are moved from individual key to individual key. When using a touch type system, the keys in the center row, or "home row," are considered to be home positions for the fingers, such as the letters J. F which are the home positions for the right and left index fingers, respectively. In the use of this type of prior art keyboard, each finger moves among various keys to access different letters during typing. Stated another way, a single key does not provide for multi-letter input, such as two inputs for two different letters from a single key.

It is also known in the prior art to provide single keys with a plurality of functions. The plurality of functions may be two, three, or even more. The plurality of functions may represent different letters which are outputted when a single key is pressed in different locations. In the prior art of this type, it is still required that there be more than eight keys to provide functions for the keyboard when using a standard QWERTY arrangement; meaning that at least some fingers must still move to different keys to access all the letters. Keyboards with a fewer number of keys and a greater number of characters per key are known, but these keyboards do not use the standard QWERTY layout and require the operator to learn an entirely different system of typing.

Still further, in the prior art, not all multi-function key designs provide for prevention of sending an incorrect signal when a key is pressed improperly. This may occur if a key is pressed improperly and there is closure of two sets of electrical contacts which send a computer device a signal that two letters have been struck simultaneously. Such simultaneous key strikes are possible in some of the known prior art, and should be avoided.

In the prior art, many keyboard footprints are of such a large size, that they are not useable for small computer devices (PDAs, smart displays, pocket translators, etc.). Therefore, a small footprint is desirable in order to provide for utility with small portable devices.

In prior art, there, are full QWERTY keyboards that are essentially "shrunk" to a smaller or miniature size to fit on portable devices; however, the inter-key spacing and overall size of these keyboards are too small to allow touch typing with all eight fingers, and the user is forced to type using the thumbs or only one or two fingers at a time.

SUMMARY OF THE INVENTION

This invention provides an alphabetical keyboard which is laid out in a standard QWERTY arrangement as shown in FIG. 1. When a touch typing system is used on a QWERTY keyboard, the fingers of the right and left hands each operate a certain group of keys on the keyboard. These key groupings are indicated on FIG. 1 by the arrows between each finger and the group of keys it operates when touch typing.

At the top of FIG. 1 there is shown a keyboard in accordance with this invention. In this keyboard, there are eight keys for the alphabet. Punctuation is at the lower portion of the right-hand three keys. In this arrangement, there are 6 three-position keys plus 2 six-position keys. Each key is operated by the finger which is dedicated to the letters on that key when touch typing using the standard QWERTY keyboard layout. However, with the keyboard of this invention, the operator need not remove any finger from a key. For instance, when operating the key containing the letters Q, A and Z, the small finger of the left hand may remain on the key at all times and merely move up and down and depress the-key in the appropriate place for the appropriate letter. Similar single finger/single key operation is provided for the letters/punctuation marks W, S and X; E, D and C; I, K and comma; O, L, and period; and P, semicolon and slash.

The center two keys each are six-position key actuated switches. These six-position keys perform the functions of the twelve central keys of the standard QWERTY keyboard. For instance, the six-position key to the right-hand side contains the letters Y, U, H, J, N and M. It is the use of the six-position key that allows the index finger to remain on a single key and to provide for actuation of all six letters. The letter J on the right-hand six-position key would comprise a home position as it does in a regular QWERTY keyboard. The difference between the six-position key and six independent keys of a regular QWERTY keyboard is that the six-position key is all one key and that the finger need not move to other keys in order to provide for the six letter inputs. The finger is merely slid from one position to another—up, down or across the key, such as from J to Y, J to M, or J to H—and then depresses the key at the desired position. The six-position key comprising the letters R, T, F, G, V and B is operated in a similar manner to the six-position key for Y, U, H, J, N and M.

As shown in FIG. 1, the keyboard disclosed herein duplicates both the hand and finger positions of a standard QWERTY keyboard. It also duplicates the finger movements of touch typing on a standard QWERTY keyboard, in other words, the relative positions of the letters each finger operates are identical to a standard QWERTY keyboard.

Further, the inter-key spacing of the preferred embodiment of this invention is ¾ of an inch between key centers, the industry standard for full-size keyboards. This allows for true, two-hand touch typing, unlike other reduced-size or miniature QWERTY keyboards where smaller keyboard size and key spacing force the user to type using the thumbs or only one or two fingers at a time.

With the keyboard layout of FIG. 1, Applicant provides a QWERTY keyboard where each finger operates only one key, yet the keys have tactilely distinct, discrete activation positions which provide for unique input for each individual letter of the alphabet and certain punctuation.

Further, the disclosed keyboard duplicates the hand and finger positions, and also the finger movements of a standard QWERTY keyboard, enabling a touch typist or a user familiar with a QWERTY keyboard to use this keyboard with no learning or retraining required.

Still further, by reducing a standard QWERTY keyboard to a single row of eight keys, the invention allows for true touch typing in small devices (such as a PDA or pocket dictionary), or in devices where space does not allow for anything but a very small keyboard, such as on the frame of a smart display or tablet personal computer.

The three-position and six-position key actuated switches of this invention duplicate the downward pressing motion of keys experienced with a standard typing keyboard. This is an important feature of the invention because it maintains the "feel" of a keyboard and avoids lateral sliding and/or pushing of the keys which are required in much of the prior art. Another important feature of Applicant's key actuated switches is that they have light actuation pressure which allows for fluid and continuous typing which is experienced on standard keyboards. Rapid typing speeds are also possible utilizing the key actuated switches of this invention. In all embodiments there is provided a very thin (low profile) design which requires a small under key depth for the keyboard. This allows for use in small devices and saves space in all applications of the key actuated switches.

Applicant, therefore, provides an alphabetical keyboard comprising a first group of six, three-position key actuated switches and a second group of two, six-position key actuated switches. The letter positions in this keyboard are arranged in a QWERTY keyboard pattern. The keys are arranged in a linear sequence from left to right as a first group of three, three-position keys followed by two, six-position keys followed by three, three-position keys. The two, six-position keys are positioned to be operated by the index finger of each hand of an operator when using a touch system commonly used for QWERTY keyboards.

The alphabetical keyboard has at least two, six-position key actuated switches which provide a different output signal when the key is:

1) pressed down at a first position where it does not tilt,
2) pressed downward at a second position where it tilts about a first substantially horizontal axis,
3) pressed downward at a third position where it tilts about a second substantially horizontal axis,
4) pressed downward at a fourth position where it tilts to one side about a substantially vertical axis,
5) pressed downward at a fifth position where it tilts diagonally about a first diagonal axis which is diagonal to both said first horizontal axis and said vertical axis, and
6) pressed downward at a sixth position where it tilts diagonally about a second diagonal axis which is diagonal to said second horizontal axis and said vertical axis.

In another embodiment, the invention may comprise a first group of five, three-position key actuated switches and a second group of three, six-position key actuated switches. In this embodiment, one of the three, six-position keys may include additional punctuation or symbols beyond that shown in FIG. 1 and be located at the right side of the keyboard where punctuation is normally located.

The three-position keys, when pressed down at the top or bottom, rock back and forth for upper and lower contacts, and move straight down when depressed in the center for a central contact. In the three-position keys, there is provision in all cases to prevent pressing of the key and causing a contact configuration which signals closure of multiple contacts which produce a signal to a device indicating that two letters have been selected simultaneously.

In the case of the six-position key, the key is configured to provide a plurality of pivot axes for the key. As the key pivots about different axes, different contacts close, producing different signals indicative of different letters.

The six-position key may also comprise a key having a plurality of feet on the bottom of said key which provide for pivot axes for said key and for circuit contact closure. The feet may be electrically conductive or nonconductive.

BRIEF DESCRIPTION OF THE DRAWINGS

FIG. 6 is a truth table showing foot numbers and requirements for contact to indicate a letter has been selected.

FIG. 11 shows a faceted electrically conductive foot on the underside of a three-position key.

FIG. 11a shows a side view of the key when there is no contact.

FIG. 11b shows the key when there is contact in the central portion.

FIG. 11c shows the key when there is contact at one side and tilting about a line between two facets.

FIG. 11d shows a contact set to be located beneath a key of FIG. 11.

FIG. 15 shows a faceted nonconductive three-position switch foot.

FIG. 15a shows a side vies of the key located in a non-depressed state.

FIG. 15b shows the key depressed closing contact (158).

FIG. 15c shows the key depressed at the top closing contact (159).

FIG. 15d shows a diagram of switch contacts (158) and (159).

FIGS. 30a-30d show a folding keyboard of the type shown in FIG. 24 built into the frame of an Ultra-Mobile PC and folded out from the bottom thereof.

DETAILED DESCRIPTION OF THE PREFERRED EMBODIMENTS

Figure 1:
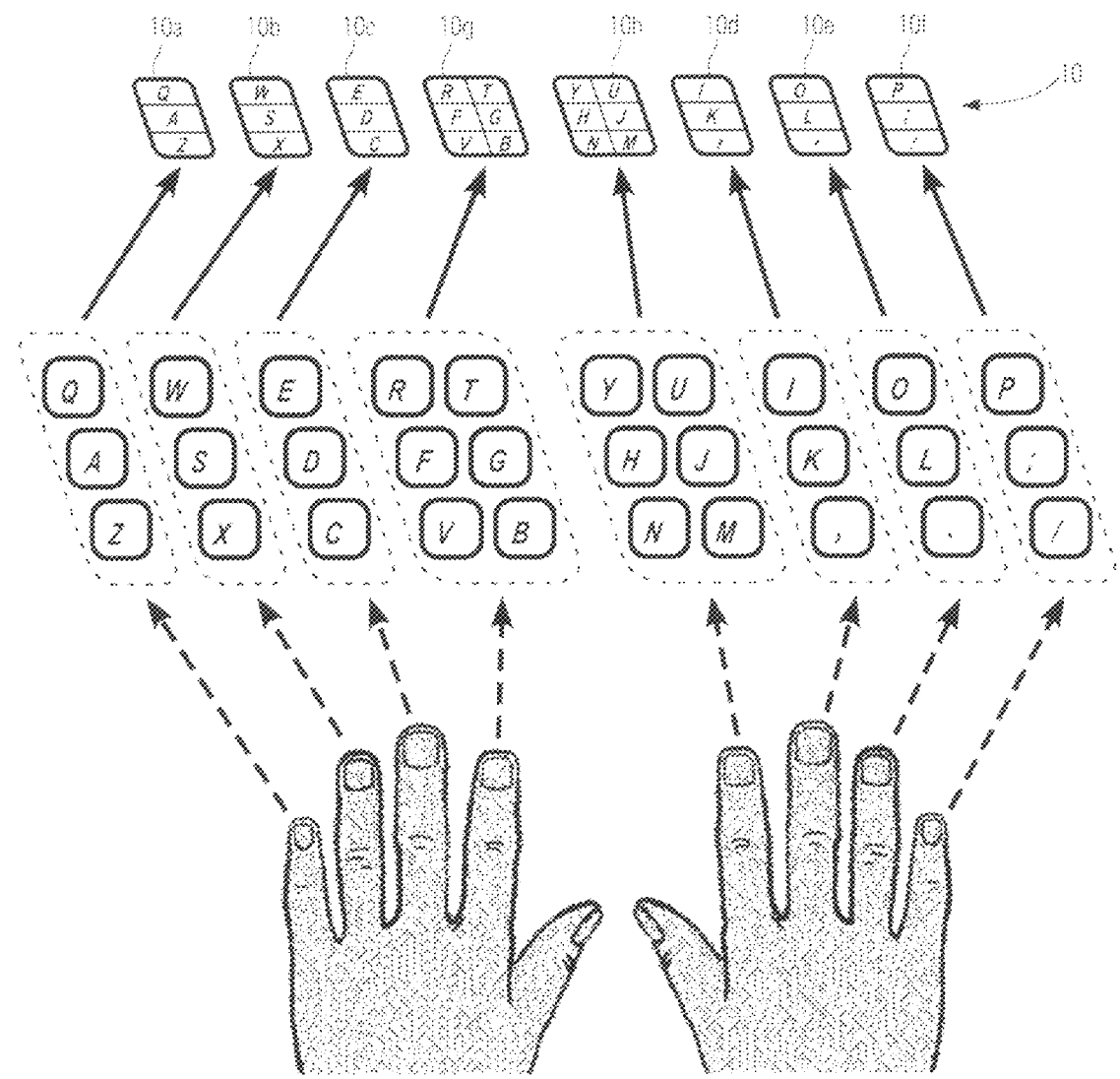
FIG. 1 shows an arrangement of six, three-position keys and two, six-position keys arranged in accordance with a standard QWERTY keyboard design. The letters and fingers designated for each key are shown.

FIG. 1 shows a keyboard (10) laid out in accordance with this invention. The keyboard (10) has a first group of three position keys, (10a), (10b) and (10c) and second group of three position keys (10d), (10e) and (10f). The keyboard further contains a third group of six-position keys. There are 2 six-position keys (10g) and (10h). The three-position keys, such as three-position key (10a) are constructed so that an operator's finger associated with the key need not be lifted from the key when typing. For instance, placement of the left hand small finger on the key (10a) at the position A allows the operator to slide the small finger up to the Q or down to the Z position from the central position A. In this manner, the finger need not leave the key, thereby providing for close placement of the letters or characters on a single key and avoidance of loss of finger position when one is using the touch typing system, normally associated with a standard QWERTY keyboard. As explained herein below, the mechanical embodiment of the key (10a) may change, but its primary function remains the same. The primary function is to provide a key which has three positions which are mutually exclusive, and which prevents closure of contacts for two letters or characters on the key at the same time, such as simultaneously making contacts for the letters Q and A which are next to each other on the key.

Keys (10g) and (10h) are six-position keys. These six positions correspond to the six letters normally actuated by the index fingers of each hand when one is using a QWERTY touch typing system. It is, of course, well known in the art of typing and keyboards that the standard is known as a "QWERTY" keyboard. Illustrated in FIG. 1 is a standard QWERTY keyboard as used with standard touch typing. In such a standard keyboard, the letters Y, U, H, J, N and M are actuated by the index finger of the right hand. In this invention, a single key (10h) is used to actuate these same six letters. The key (10h) is a six-position key allowing for actuation of each of the six letters associated with the key.

In order to provide for mutual exclusivity of the letters associated with the key (10h), the key is permitted to move in a different manner to actuate each letter. For instance, actuation of the letter J allows the key to move straight down when J is pressed. When U or M is pressed, the key will tilt about the upper or lower edge of the letter J to provide for contact at U and M, respectively. If the letter H is selected, the key will tilt about the left-hand edge of the letter J. Finally, if the letter Y or N is selected, the key will tilt about an axis associated with either Y and N where the axis is diagonal to the edges of the letter J. In this manner, the index finger will never be required to be lifted away from the key (10h). However, as it is moved from letter to letter and the finger presses down, the key will tilt about an axis as explained above. As the key tilts about different axes, different pairs of contacts or different contacts are made beneath the key. The tilting about the different axes acts to prevent more than one letter from being actuated at the same time when the key is pressed downward. For instance, tilting about an axis between the letters J and U will prevent actuation of contacts associated with the letter J when the letter U is pressed. This feature of the invention prevents double contact or false contacts, of letters which are not intended if the finger is pressed down at a point which would put a downward force on both J and U simultaneously. If force is exerted between J and U, only one will be activated.

Since this keyboard is designed for a touch typing system, the index finger, such as the index finger of the right hand, need never be removed from the key (10h). However, the letter J will be considered to be a home, position for the index finger of the right hand when using a touch typing system. Similarly the letter F would be a home position for the index finger of the left hand.

Also shown in FIG. 1 associated with the keys (10d), (10e) and (10f) are punctuation, such as comma, period, slash, and semi-colon. It is also well known that keyboards generally contain additional punctuation and symbols to the right hand side of the letter P. Therefore, the key (10f) may in an alternative embodiment be constructed as a six-position key instead of a three-position key. With a six-position key it is possible to provide, in addition to the letter P, semi-colon and slash, three additional punctuation marks or symbols, or six if used in conjunction with a shift key.

As illustrated in FIG. 1, the keyboard is explained with respect to the QWERTY touch typing system. However, the standard touch typing method need not be used with this keyboard. For instance, the "hunt and peck" system may also be used with success with Applicant's keyboard. The keys provide for actuation of a single letter function when pressed down at a particular position. Therefore, one using a hunt and peck method may use a single finger to actuate many different keys, such as (10d) and (10e) and (10f) as well as (10h). Although "hunt and peck" has its limitations, it is to be understood that this invention is not limited to touch typing and it may be used with a hunt and peck system. Still further, the invention could be used with any other keyboard configuration of the letters and punctuation.

However, since the QWERTY keyboard has become the standard, it has been used to illustrate this invention.

As shown in FIG. 1, the keys are arranged as a first group of six, three-position keys and a second group of two, six-position keys. The six-position keys are arranged at the center in order to be actuated by the index fingers of a person utilizing a touch typing method as learned on a standard QWERTY type keyboard.

Six-Position Key Actuated Switch

Embodiment 1

Figure 2:
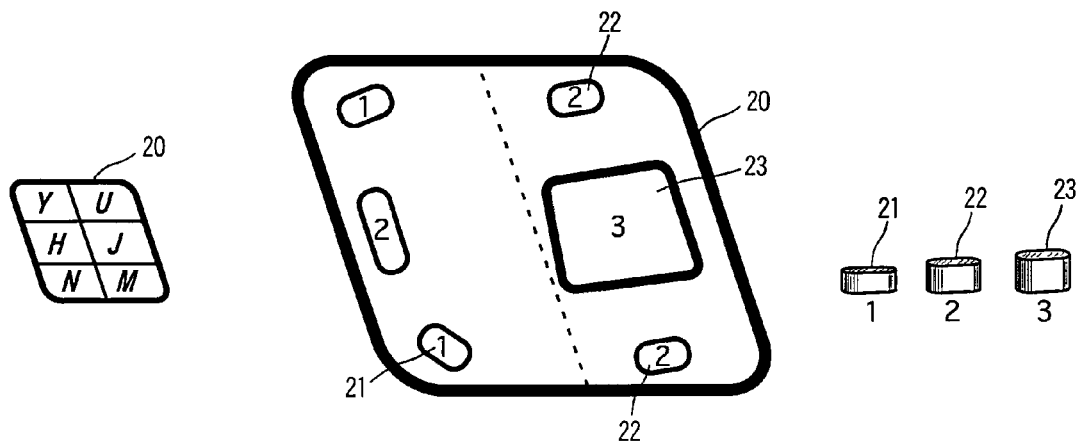
FIG. 2 shows a six-position key design utilizing conductive feet.
Figure 3:
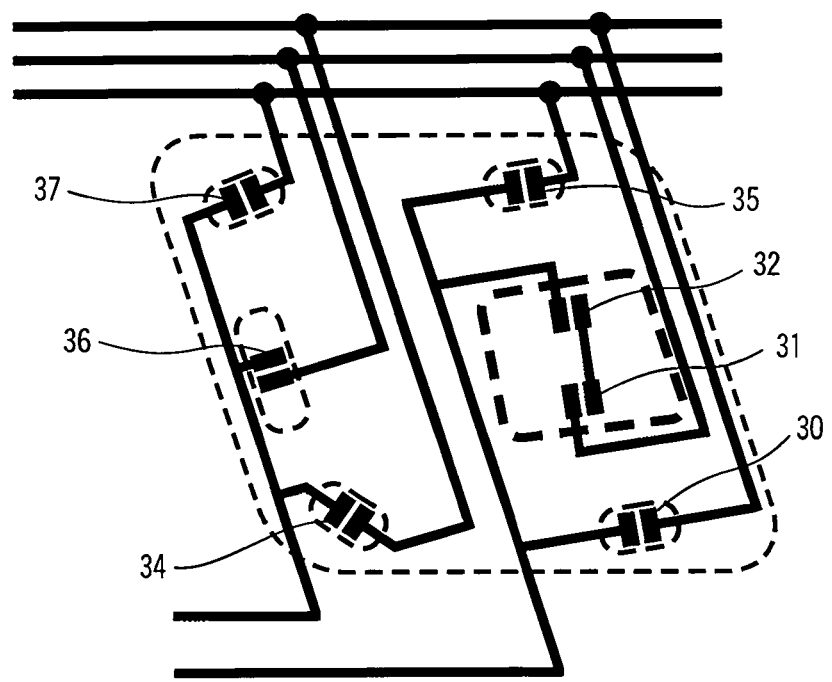
FIG. 3 shows contacts which may be used with the six-position key design of FIG. 2 where the contact pairs are closed by the conductive feet of FIG. 2.

FIG. 2 shows a first embodiment of a six-position key actuated switch. In this embodiment, there are six conductive contact feet on the bottom of the key 2. In order of ascending height, they are numbered 1, 2 and 3 respectively, as shown at the right side of key 20. Reference numeral (21) indicates the shortest height 1, reference numeral (22) indicates intermediate height 2, and reference numeral (23) indicates a greater height 3. The conductive contact feet having the three different heights shown in FIG. 2 provide for closure of switch contacts shown in FIG. 3. In FIG. 3, contact pair (30) is closed by the lower conductive foot (22) of FIG. 2. The contacts (31) and (32) are closed by conductive foot (23) of FIG. 2 and contact pair (34) is closed by a conductive foot (21).

Figure 2A:
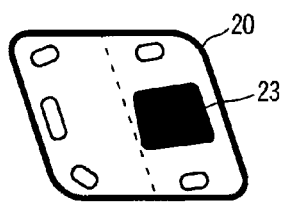
FIG. 2a shows the six-position key design where the conductive foot (23) forms closure of contacts (31) and (32) of FIG. 3.
Figure 2B:
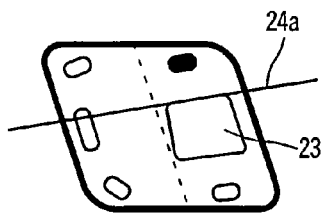
FIGS. 2b-2f show the six-position key design where the key tilts about different axes to provide for making of different contacts with conductive feet.
Figure 2C:
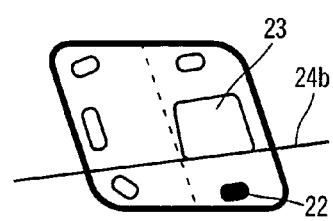
Figure 2D:
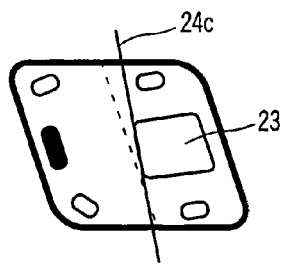
Figure 2E:
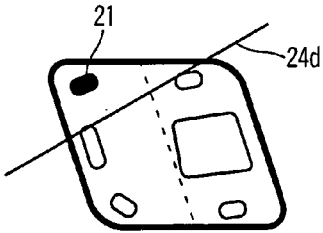

FIG. 2a illustrates key (20) when depressed at the letter J. In this position, the conductive foot (23) causes closure of contact pairs (31) and (32), see FIG. 3, which provides a signal from the keyboard that the letter J has been pressed. FIG. 2b shows closure of a contact foot having a height 2 (22) at the top right portion of the key. This corresponds to the letter U in the illustration. Pressing down at the top position for the letter U will cause closure of contacts (35) shown in FIG. 3 and a signal that the letter U has been selected will result. Reference numeral (24a) denotes a pivot line (tilt axis) for the key (20) when the letter U is depressed. The pivot line is provided by the upper edge of the conductive contact foot (23). The key rolls about this upper edge (24a). The action of the key rolling about the upper edge prevents closure of contacts (31) when the letter U is depressed. In this manner, there can be only one unique signal sent from the key upon pressure applied to the key at the letter U. FIG. 2c illustrates the key tilting about an axis (24b) which is defined by a lower edge of the conductive contact foot (23) when the letter M is depressed. This causes closure of contact pair (30) by foot (22). FIG. 2d illustrates tilting about an axis (24c) which is along the left hand side of conductive contact foot (23). When the key is depressed at the letter H, the key will tilt slightly about axis (24c) which is defined by a left side edge of the conductive foot (23). This prevents closure of contacts (32), (31) by conductive foot (23) and allows closure of contacts (36) by the conductive foot above it. FIG. 2e illustrates tilting of the key (20) about an axis (24d). Tilting about axis 24d is tilting about a diagonal axis. This tilting is possible because the conductive feet (22) (see FIG. 2) have an intermediate height which is higher than height (1) of foot (21) shown in FIG. 2e. Therefore, the key will tilt about axis (24d) and allow closure of contacts (37) by a foot (21). Again, closure of contacts (37) by conductive foot (21) in combination with tilting of the key prevents closure of other contacts, thereby preventing false or erroneous signals from the key. Stated another way, the closure of the switch contacts are all mutually exclusive, and cannot produce two signals indicative of two separate letters upon depressing of the key at a single place.

Figure 2F:
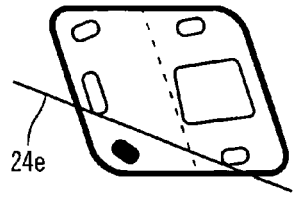

FIG. 2f is similar to FIG. 2e except that it shows tilting about an axis (24e) which produces contact at a location associated with the letter N by closing contacts (34).

Embodiment 2

Figure 4:
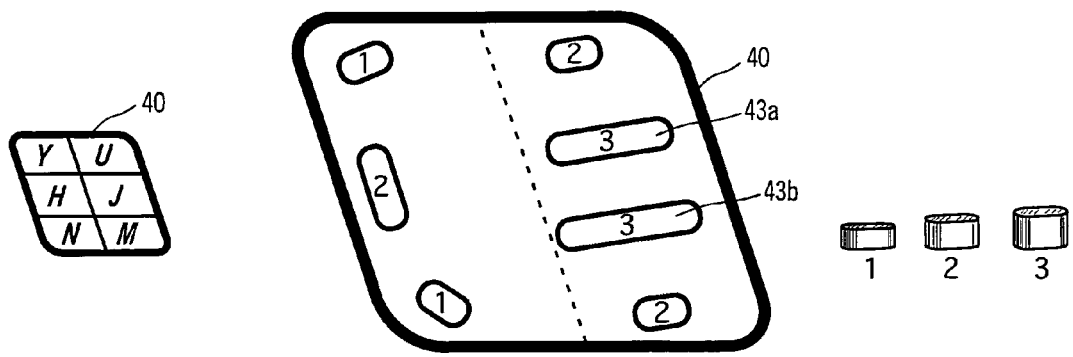
FIG. 4 shows an alternative design to that shown in FIG. 2 wherein the conductive foot designated (23) in FIG. 2 is shown as (43a) and (43b) in FIG. 4.
Figure 4A:
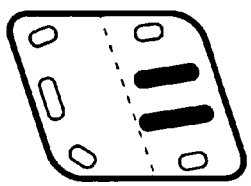
FIG. 4a shows the conductive feet of FIG. 4 when contact is made with contacts (31) and (32) of FIG. 3.
Figure 4B:
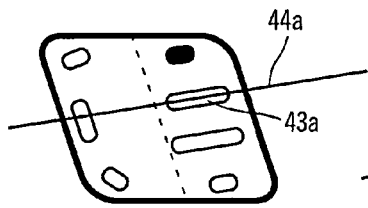
FIGS. 4b-4f show the six-position key design of FIG. 4 in different positions where the key tilts about different axes depending upon where pressed.
Figure 4C:
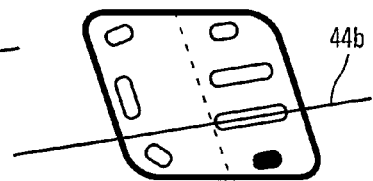
Figure 4D:
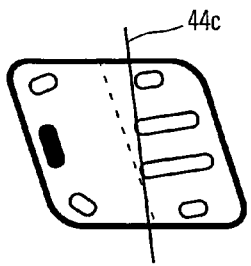
Figure 4E:
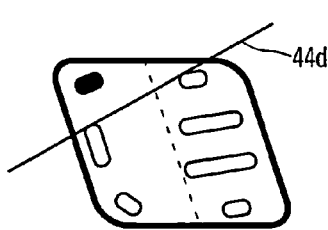
Figure 4F:
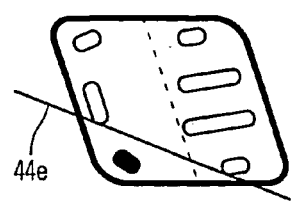

FIG. 4 shows another embodiment similar to FIG. 2. The difference is that the contact foot (23) as shown in FIG. 2 is constructed as a pair of contact feet (43a) and (43b) as shown in FIG. 4. Key (40) is otherwise the same as key (20). When key (40) is pressed downward at the location J as shown in FIG. 4a, the contact feet (43a) and (43b) provide closure of contact pairs (31) and (32) of FIG. 3. FIG. 4b shows tilting about an edge of contact foot (43a) which acts like the upper edge of contact foot (23) shown in FIG. 2. This gives tilting about an axis (44a). It can easily be seen that axes, (44b), (44c), (44d) and (44e) are defined by the different heights of the conductive contact feet in the same manner as that described with respect to axes (24b)-(24e) of FIGS. 2c to 2f.

Embodiment 3

Figure 5:
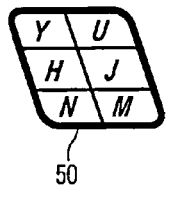
FIG. 5 shows a six-position key design where nonconductive feet are utilized with the height of the feet identified as 1, 2, 3.
Figure 5:
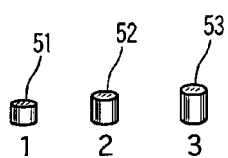
Figure 5:
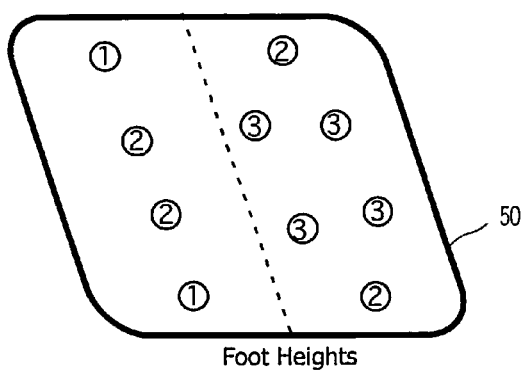
Figure 5G:
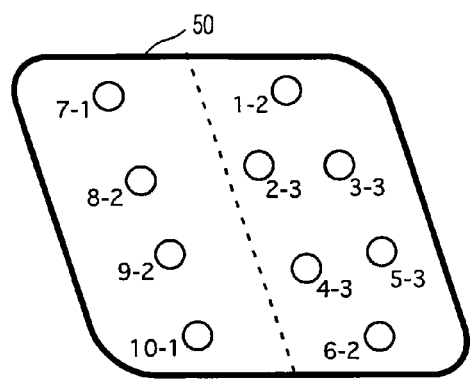
FIG. 5g is a diagram of all feet on the bottom side of the key identifying each foot. The first number for each foot indicates a foot number and the second number for each foot indicates its height.
Figure 5A:
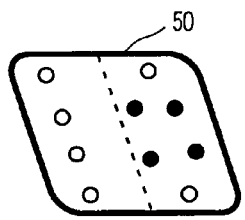
FIG. 5a shows the feet which are used to make circuit contacts when the letter J is pressed.
Figure 13A:
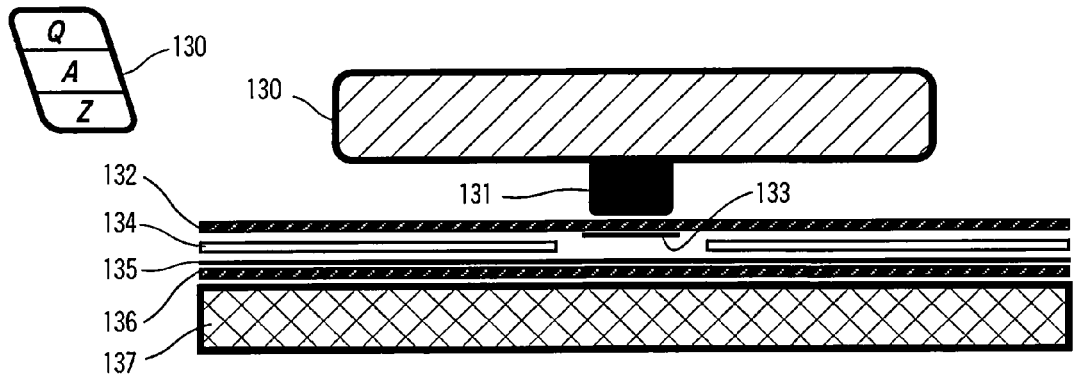
FIG. 13a shows a cross section of conductive traces and nonconductive layers for switching when nonconductive contact feet are used.

FIG. 5 shows a six-position key actuated switch (50) utilizing nonconductive contact feet. The nonconductive contact feet (51), (52) and (53) have different heights 1, 2 and 3 which allow the key to assume six unique positions depending upon the point (letter) at which the key is pressed downward. In this embodiment, the feet (51), (52), (53) are not electrically conductive. Instead, pressure down on the key at various locations corresponding to letters will result in closure of contacts placed below the key. Typical contacts located under key (50) are shown in FIG. 13a. FIG. 5a shows the key (50) when depressed at the J position. In this position the four long feet which have a length 3 denoted by reference numeral (53) are shown in black; these are feet 2-3, 3-3, 4-3 and 5-3 shown in FIG. 5g. The black in FIG. 5a indicates that it is these four feet which force closure of switch contacts below. Three of the four feet (2-3, 3-3, 4-3 and 5-3) are required to make a contact in order to signal the letter J.

Figure 5B:
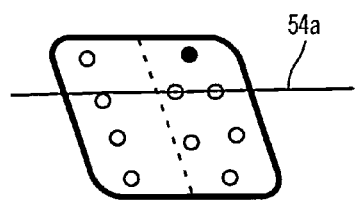
FIGS. 5b-5f show the key (50) in different positions where the key tilts about different axes to close different circuits.
Figure 5C:
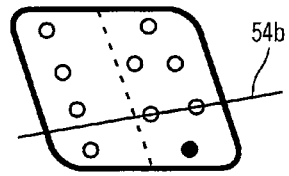

FIG. 6 shows a logic table for the contacts of the key (50) which would be programmed into the logic firmware or circuitry that the keyboard is connected to. The four conditions of the letter J show the three out of four contact closures for signaling J. Obviously, if four out of four contacts for J are made, any of the three out of four conditions is satisfied. In any event, the contact provided by the four black feet (2-3, 3-3, 4-3, 5-3) shown in FIG. 5a must provide a signal only when the letter J is pressed. In FIG. 5b there is shown the key (50) where the letter U is pressed. In this case, there must be contact produced by a foot (1-2) having a length 2 beneath the letter U (see FIG. 5g) which forces contacts to engage beneath the key (50). The contact feet such as (1-2) are shown on the left column of FIG. 6 which gives the conditions for the letter U. It is only when contacts associated with the black foot shown in FIG. 5b are connected that the letter U is possible. Still further, as shown in FIG. 5b, there is an axis (54a). The axis (54a) is drawn through the 20 center line of the feet (2-3) and (3-3). However, it is understood that the axis actually passes through a point on the foot circumference. Therefore, when the key is pressed at the letter U, the key will tilt about the axis (54a) because the feet (2-3) and (3-3) are longer than the foot (1-2). FIG. 5c shows the key (50) when depressed at the letter M. Here, contact is made by the lower intermediate length foot (6-2) which is shown in black and contact occurs by closure of switch connections located beneath the key in response to pressure from contact foot (6-2). In this position, the key will tilt about an axis (54b) which runs through the center of the feet (4-3), (5-3) of length 3 located as shown in FIG. 5c and FIG. 5.

Figure 5D:
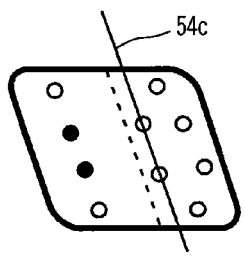

In FIG. 5d, there is provided for closure of two switches beneath feet (8-2) and (9-2) which have a length 2, and are shown in black in FIG. 5d. Closure of these switches is in response to pressing the letter H. Upon pressing of the letter H, the key (50) tilts about an axis (54c) which lies through the feet (2-3), (4-3) of length 3 as shown in FIG. 5d. This allows the key to tilt and provide contact via the two black feet. It should be noted that although contact would be provided with the feet through which the axis is drawn, this will not produce a response for the letter J because the logic table requires three of the four contacts beneath letter J to be connected (see FIG. 6).

Figure 5E:
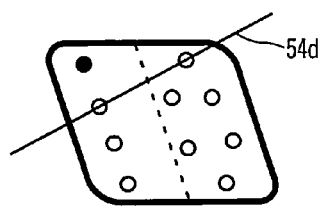
Figure 5F:
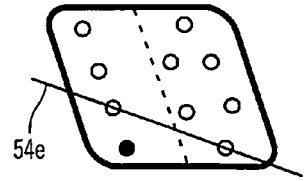

FIG. 5e shows the case where the letter Y is depressed. In this case, a short foot (7-1) beneath the letter Y causes a closure of switch contacts beneath the key (50) and tilting about 20 an axis (54d) which passes through two feet (8-2), (1-2) each having a length of 2 as shown. Since closure of contacts beneath the black foot (7-1) shown in FIG. 5e is required, tilting about the axis (54d) which necessarily causes other contacts to connect, will not produce a signal for the letters H or U because as shown in Table 6, not all conditions will be met.

Embodiment 4

Figure 7:
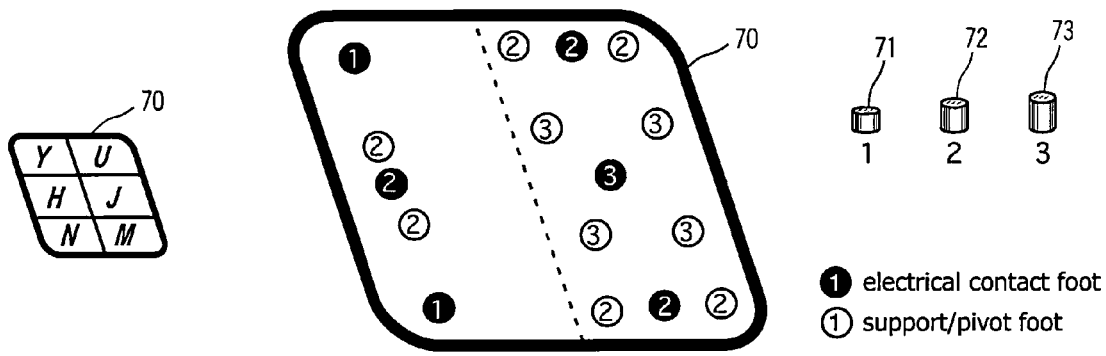
FIG. 7 shows a six-position key design which utilizes a combination of conductive electrical contact feet and nonconductive support/pivot feet. Also shown in FIG. 7 by number is the foot height.
Figure 7A:
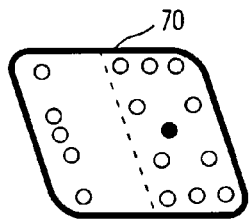
FIG. 7a shows the location of the single conductive contact foot utilized for signaling of the letter J.
Figure 7B:
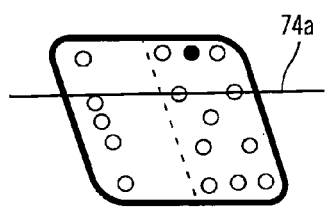
FIGS. 7b-7f show the required electrical conductive contact feet in black and the axes about which the key must tilt in order to provide for contact.
Figure 7C:
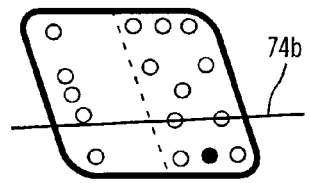
Figure 7D:
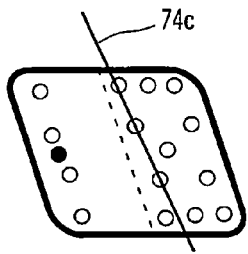
Figure 7E:
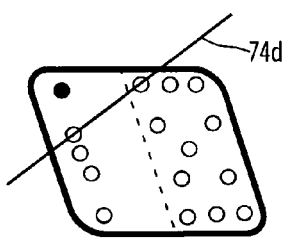
Figure 7F:
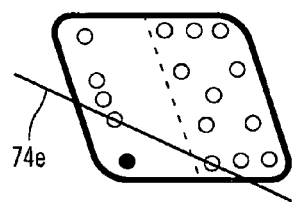
Figure 8:
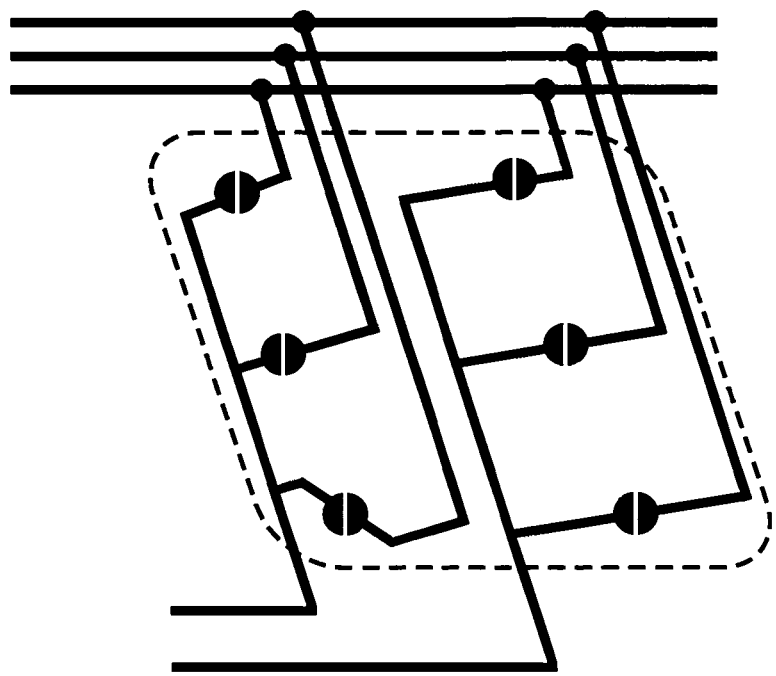
FIG. 8 shows a configuration of keys that may be used with the six-position key of FIG. 7 where contacts are made by the electrically conductive contact feet.

FIG. 7 shows another embodiment of a six-position key actuated switch which utilizes a combination of support/pivot feet and electrical contact feet. In this embodiment the support/pivot feet provide for pivoting and movement of the key (70) about the axes (74a)-(74e) shown in FIGS. 7b-7f. The key has the same configuration as that shown in FIG. 5 which is that for the letters Y, U, H, J, N and M normally touched by the right index finger utilizing a QWERTY touch typing method. In this embodiment, when key (70) is pressed straight downward at the point J, along contact foot (3) may engage electrical contacts or a switch located there beneath as shown in FIG. 8. Only the foot beneath the letter J will make contact because the feet (3) remain higher than the feet (2) and (1). This condition is also shown in FIG. 7a. In FIG. 7b there is shown the case where the key is pressed at the letter U. Here the key (70) will tilt about feet 3 which lie between J and U, thereby preventing any contact that might be made by the contact foot (3) beneath J. On the other hand, tilting about (3) allows contact to be made by contact foot (2) beneath the letter U shown in black in FIG. 7b. This is shown as tilting about an axis (74a) in FIG. 7b. In FIG. 7c, there is shown actuation of the key (70) when the letter M is pressed. Here there is tilting about the lower feet (3) associated with the letter J which produces tilting about an axis (74b) as shown in FIG. 7c. This allows contact beneath the intermediate length contact foot (2) which is black in FIG. 7c without engagement of contact foot (3) located beneath the letter J. In FIG. 7d, there is shown closure of a switch when the letter H is pressed. Here a foot also having a length (2) is shown as a black foot in FIG. 7d. This foot causes electrical contact while its associated feet (2) which are support/pivot feet do not produce electrical contact. The electrical contact may be made by an electrically conductive contact foot, or by pressing down an electrical contact in a surface beneath. As shown in FIG. 7e, there is tilting about a pair of feet (2) (seen in FIG. 7) where the feet (2) are support/pivot feet associated with the letters H and U. In FIG. 7e there is shown closure of the switch when the letter Y is pressed. Here, the key is allowed to tilt about a pair of pivot feet having a length (2). One of these pivot feet is associated with the letter H and the other is associated with the letter U as shown in FIG. in 7e. As the key tilts about the axis (74d), closure of the switch is made by the short contact foot (1) shown in black FIG. in 7e. This is also a black foot shown in FIG. 7. Since (1) is a shortest length, there will be no other contacts made by the key when pressed at the letter Y. FIG. 7f shows a similar contact arrangement for the letter N which has a diagonal pivot line running through feet of lengths (2). The feet of length (2) indicated in FIG. 7 are associated with the letters H and M as shown in FIG. 7. Since the black foot shown in FIG. 7f is a short foot, only this foot will provide for electrical contact. Tilting is about axis 7e.

FIG. 8 shows a set of six contacts and buses which may be used to provide for switching with the key of the embodiment shown in FIG. 7. Here, six simple switches are shown. These switches may either be pairs of contacts which are closed by electrically conductive feet as in FIG. 3, or they may be switches constructed on electrical substrates of the type which are described in FIGS. 12a and 13a with respect to three position switches for purposes of simplicity.

Three-Position Key Actuated Switch

Embodiment 1

Figure 9:
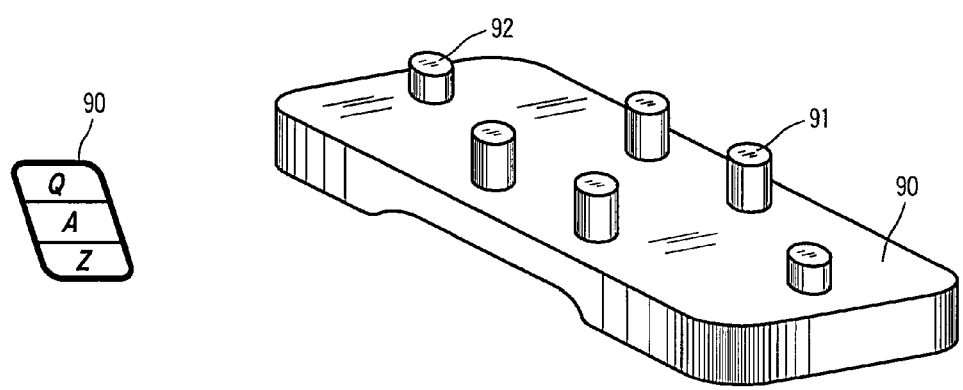
FIG. 9 shows a three-position key.
Figures 9A, 9B, 9C, 9D:
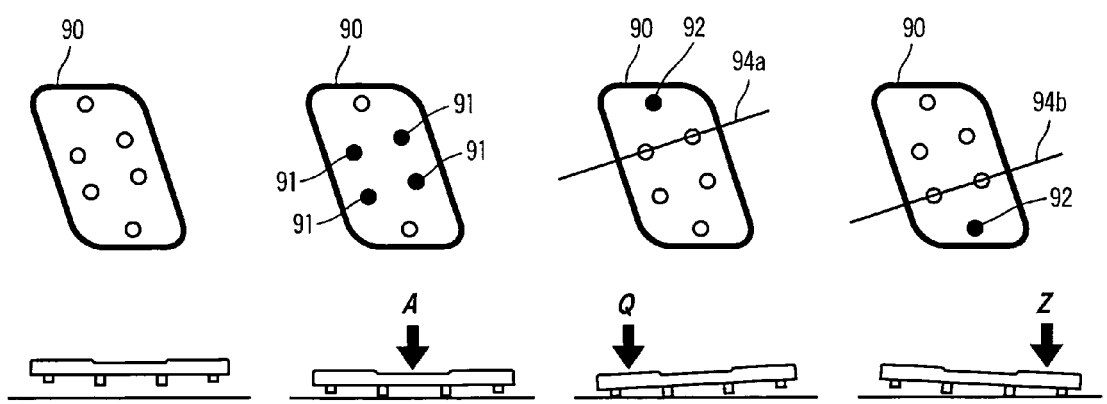
FIG. 9a shows a side view of the three-position key when it is not depressed.
FIG. 9b shows the three-position key when depressed at the letter A.
FIG. 9c shows the three-position key when depressed at the letter Q and tilted about axis (94a).
FIG. 9d shows the three-position key when pressed at the letter Z with tilting about an axis (94b).

FIG. 9 shows a three-position key actuated switch of the type generally illustrated in FIG. 1 as keys 10a-10f. The key (90) is a key which may be used for the letters Q, A and Z. The key (90) has two groups of feet. There is a central group of four feet (91) which are all of the same length and which are longer than a second group of feet (92) which are located close to the top and the bottom edges of the key (90). FIG. 9a shows the positions of the feet beneath the key, and a side view when the key is not pressed down. FIG. 9b shows the key when pressed down at position A. In this position, the operative contact feet (91) are shown in black. Three of the four contact feet (91) are required to complete a circuit either by the conductive foot method or by closure of switches by the foot. When three of the four closures that are required for registering of the A keystroke occur, the letter A is signaled. In FIG. 9c there is shown the key when in a position where the letter Q is pressed. Here a contact foot (92) shown in black is pressed downward for the letter Q causing closure of a switch or completion of contacts. Also shown in FIG. 9c is a tilt axis 94a which passes through point of contact of the feet (91) at the top side of the letter A. When there is tilting along axis (94a), there is necessarily contact by the two upper feet (91) of the letter A; however, this is not a condition where the letter A is registered because A requires registry of at least 3 out of 4 of those feet. Therefore, the key may tilt about contact feet as shown in FIG. 9c in order to allow closure by the contact foot beneath the letter Q. In FIG. 9d there is shown the key (90) when depressed at the letter Z. Here, the key tilts about an axis (94b) which is defined by the two feet (91) located along the bottom portion of the letter A. Since feet (91) are longer than feet (92) shown in black in FIG. 9d, there will be tilting about axis (94b) causing closure by the short contact foot (92) beneath the letter Z. This is a unique signal for the letter Z because the letter A cannot be registered since 3 out of its 4 contacts are not completed.

In the embodiment shown in FIG. 9, the structure located beneath the key (90) may be either switches which are closed by pressure from the feet (91) and (92) or it may be contact pairs which are closed if feet (91) and (92) are conductive.

Figure 10:
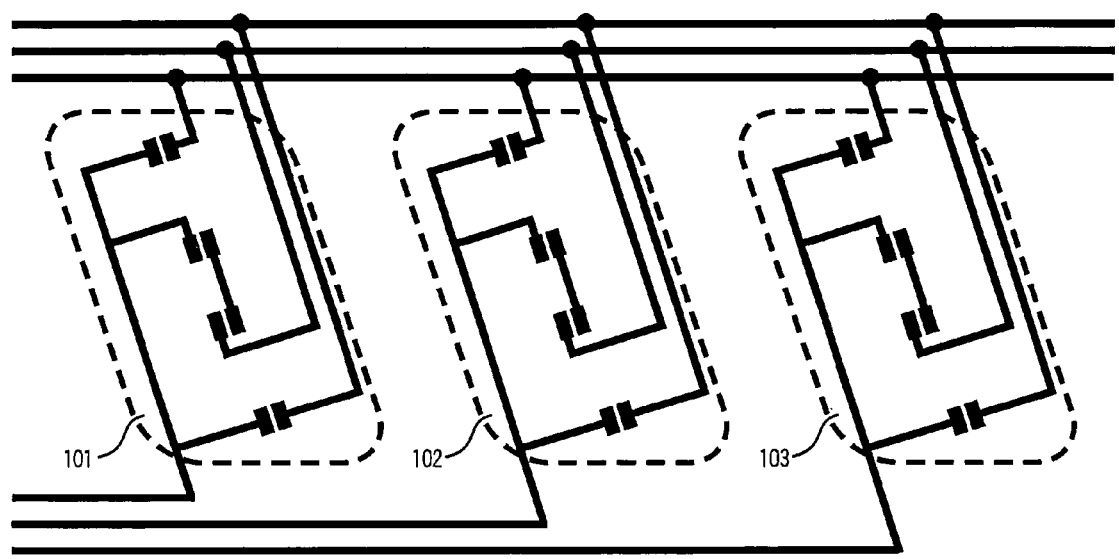
FIG. 10 shows electrical contacts which may be completed by contact feet of the type shown in FIG. 12c where the feet are electrically conductive.

FIG. 10 shows contact pairs located on a substrate. Contacts (101) may be used beneath key (10a), contacts (102) may be used beneath key (10b) and contacts (103) may be used beneath key (10c) in FIG. 1. Similar arrangements of contacts and busses may be used for the rest of the three-position keys utilized on the keyboard (10).

Embodiment 2

FIG. 11 shows another embodiment of a three-position key actuated switch. In this embodiment, there is a single conductive rubber foot with angled facets located on the underside of the key (111). The foot (112) has pivot edges (113) and (114) which allow the key to tilt or rock back and forth in response to pressure applied at different points. As shown in the side view of FIG. 11a, when no pressure is applied to the key, the key remains above a contact surface (115) located beneath it. On the other hand, when the key is pressed at a point for the letter A, the key moves straight down and closes contacts (116) located directly beneath this center section or facet of the key as illustrated in FIGS. 11d and 11b. When the key is pressed at a top portion, such as for the letter Q, the key will tilt about a pivot axis as shown in FIG. 11c, making contact at contact pair (117) when the upper facet moves downward.

Embodiment 3

FIG. 15 shows another embodiment where a rocking type single foot is used, but the foot is nonconductive. This is shown in FIGS. 15a to 15d. Here the contacts lie beneath the facets of the key (155) and, as shown in FIG. 15b provide for closure at the center contact when the key is pressed straight down at a point for the letter A. This contact is illustrated in FIG. 15b and is identified as reference numeral (158). When the key is pressed at the letter Q the key will tilt about a pivot line (154) allowing closure at a contact (159) which is shown in FIG. 15c.

Embodiment 4

Figure 14:
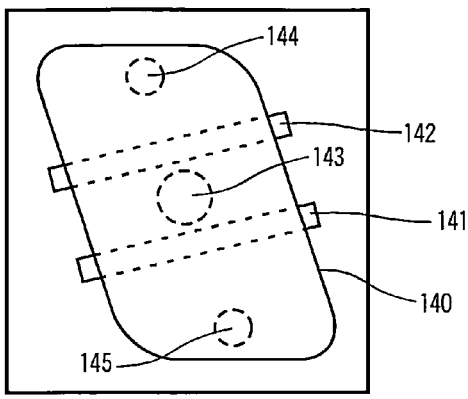
FIG. 14 shows a three-position key which is supported by substrate supports. This key rocks on the substrate supports.
Figure 14A:
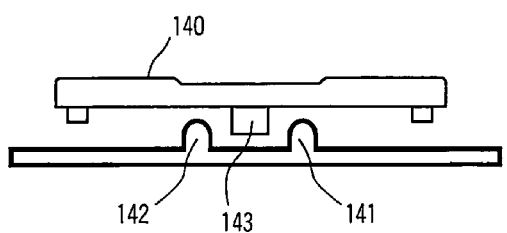
FIG. 14a shows a side view of substrate supports and key feet when the key is not depressed.
Figures 14C, 14J:
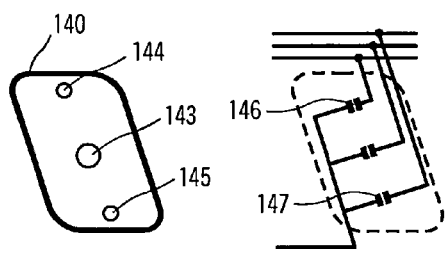
FIG. 14c shows contacts that may be located beneath the key (140) where the contact feet (143) (144) and (145) are conductive.
FIG. 14j shows the three contact feet of key (140).

FIG. 14 shows another embodiment of a three-position key actuated switch (140). In this embodiment pivoting of the key (140) is provided on substrate supports (141) and (142). The key as shown in the side view of FIG. 14a has a central foot (143) which moves downward between supports (141) and (142) to make contact with a circuit below. The circuit below may be closed by a conductive contact foot (143), or by pressure when the foot causes contact in substrates with conductive traces. Next, as shown in FIG. 14j, there are two additional contact feet located at the top and the bottom of the key which are (144) and (145). There may be the letters A, Q and Z for key (140). As shown in the side view of FIG. 14b, when no pressure is exerted on the key (140), no contact is made with the substrate to close switches or contact pairs which are shown in FIG. 14c. When the letter A at the center of the key is pressed, contact is made as shown in FIG. 14k. When a letter such as the letter Q is pressed, the key (140) tilts down to the left as shown in the side view of FIG. 14d causing the central contact foot to rise and the contact foot (144) beneath the letter Q to fall and cause contact with a pair of contacts (146) located beneath the foot (144). These are the contacts (146) as shown in FIG. 14c. In this position, the key tilts about support (142) in response to pressure applied at the top, and prevents closure of two contacts at one time. Contacts (147) are closed by foot (145) when the letter Z is pressed.

Figures 14E, 14I:
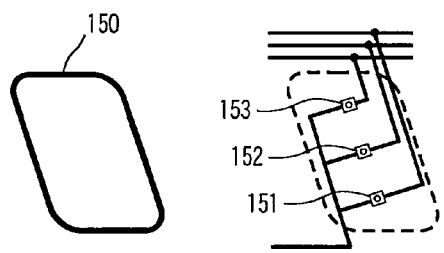
FIG. 14e shows a top view of a key (150).
FIG. 14i shows the location of contact switches (151), (152) and (153) beneath key (150).
Figure 14B:
FIG. 14b shows the key when not depressed.
Figure 14F:
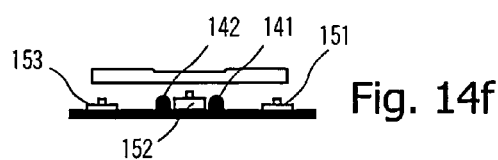
FIG. 14f shows a side view of key (150) which is in an open position.
Figure 14K:
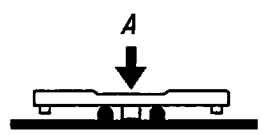
FIG. 14k shows the key (140) when depressed at the center.
Figure 14G:
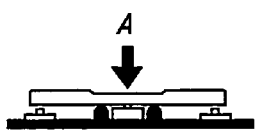
FIG. 14g shows a side view of key (150) when depressed at the center, thereby causing closure of a contact (152).
Figure 14D:
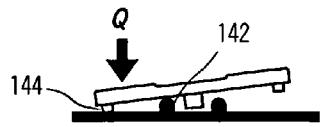
FIG. 14d shows the key (140) when pressed down at the top.
Figure 14H:
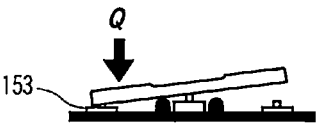
FIG. 14h shows the key (150) when depressed to close contact (153).

FIG. 14e shows another embodiment (150) of the key which is reference numeral (150). In this embodiment, key (150) has no feet on its under surface. Instead there are supporting substrate push action switches (151) (152) and (153). These are shown in FIG. 14i and in the side view of FIG. 14f. When the key (150) is pressed downward either at the center or at the top or bottom, it will tilt about supports (141) and (142) to cause closure of one of switches (151), (152) or (153) as shown in FIGS. 14g to 14i.

Conductive Contacts

Figure 12A:
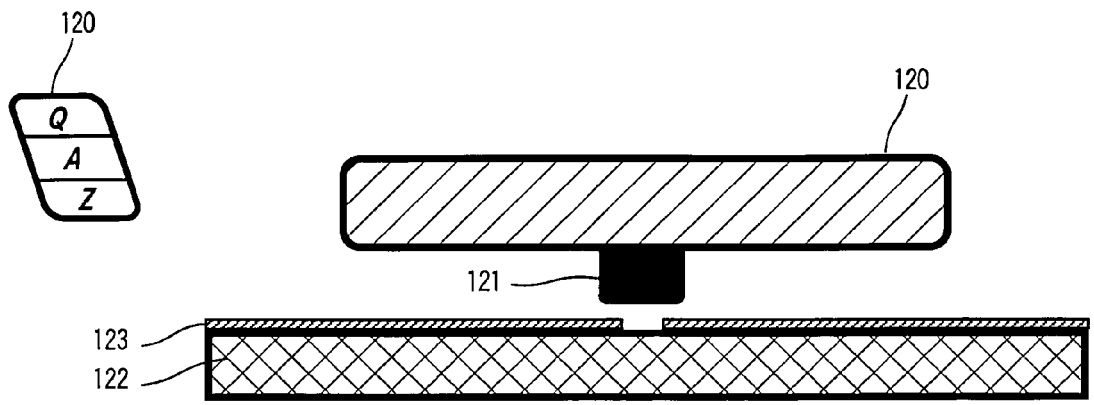
FIG. 12a shows a design for a three-position key (120) switching arrangement designed for a conductive rubber contact foot with the key in an open position and copper traces on a substrate.
Figure 12B:
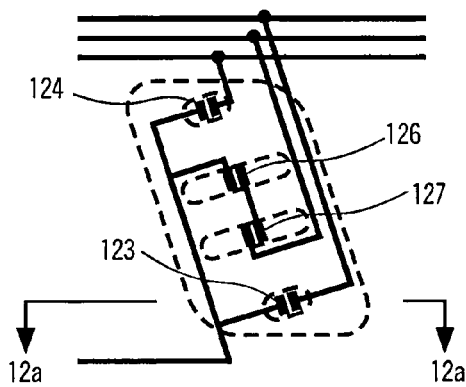
FIG. 12b shows a top view of the copper traces of FIG. 12a, with the key and conductive feet outlines shown in dotted lines.
Figures 12C, 12D:
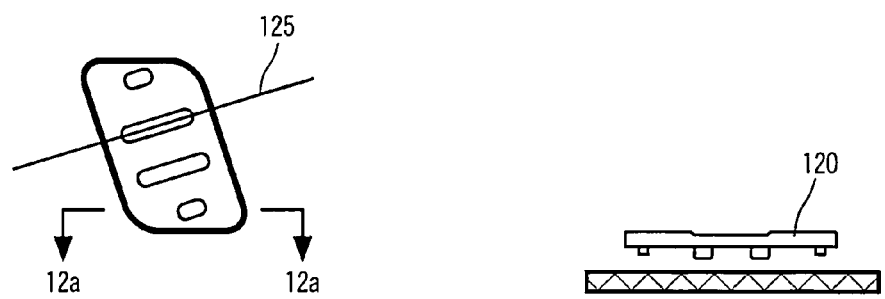
FIG. 12c shows the conductive feet of a key which provides for tilting about an axis (125) when a top portion of the key is pressed.
FIG. 12d shows a side view of a key (120).

FIG. 12a shows a conductive contact foot embodiment of a three-position key actuated switch. The conductive contact feet may be conductive rubber. FIG. 12a shows a key (120) which may be a key (10a) for the letters Q, A and Z. The conductive rubber contact foot (121) is on the underside of key (120). A substrate (122) is placed beneath the key and copper traces (123) are placed upon the substrate to provide conductive paths for sending signals. A typical pattern for copper traces is shown in FIG. 12b. FIG. 12b shows the pairs of copper trace contacts, such as pair (123) which are closed by contact with rubber contact feet, such as a contact foot (121) shown in FIG. 12a. FIG. 12d shows a side view of the key (120) which shows that the central contact feet are longer than those at the top and the bottom. The central contact feet lie beneath the letter A while those at the top and the bottom lie beneath the letters Q and Z respectively. This provides for pivoting of the key about the axis such as axis (125) shown in FIG. 12c when the letter Q is pressed. Since the key tilts about axis (125) the output signal for Q will be unique because there cannot be closure of both of contacts (126) and (127) depicted in FIG. 12b.

Nonconductive Contacts

Figure 13D:
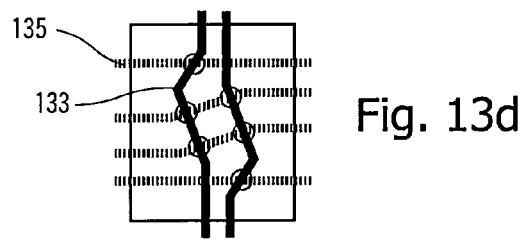
FIG. 13d shows a matrix of conductive traces which will lie beneath a key and which will provide output when traces are pressed together.
Figure 13E:
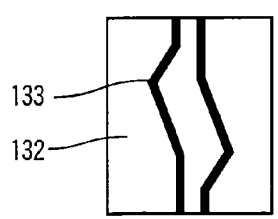
FIG. 13e shows a top nonconductive layer and conductive traces.
Figure 13F:
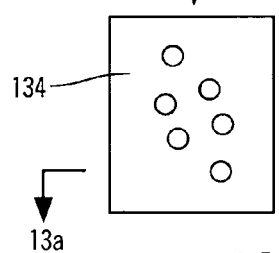
FIG. 13f shows a spacer with holes for the feet to press conductive traces together.
Figure 13G:
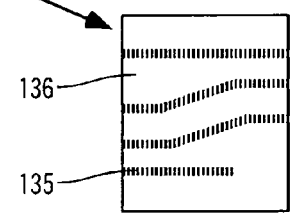
FIG. 13g shows a bottom nonconductive layer having conductive traces.
Figure 13B:
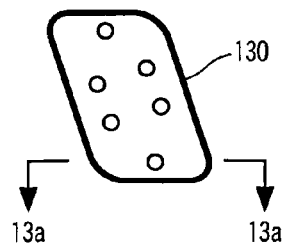
FIG. 13b shows the nonconductive feet of a key.
Figure 13C:
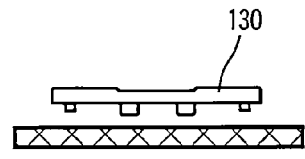
FIG. 13c shows a side view of a key.

FIG. 13a shows an embodiment of a three-position key actuated switch where the contact feet (131) on the underside of the key are nonconductive. FIG. 13a shows a key (130) having a contact foot (131) which presses downward when the key is depressed. The structure beneath the key has a first flexible nonconductive top layer (132) against which a nonconductive contact foot (131) is pressed when the key is pressed. This top nonconductive layer prevents contamination of the contact substrates beneath, and provides a surface upon which a conductive trace (133) layer may be placed. In this embodiment, a top conductive trace (133) is placed upon the bottom of the top nonconductive layer (132) and beneath the contact foot (131). Next, a nonconductive spacer (134) is placed beneath the nonconductive layer (132). The purpose of the spacer is merely to prevent contact when the key (130) is not pressed downward to cause engagement of conductive traces (133) and (135). Conductive trace (135) is located beneath the nonconductive layer (134) and may be applied to a support substrate (137) or placed on a nonconductive layer (136). When the contact foot (131) is pressed downward from the position shown in FIG. 13a, the trace (133) will move downward to engage trace (135) thereby completing closure of the contacts. FIG. 13b shows a view of the feet of key (130). FIG. 13c shows a side view of key (130) with the feet having different lengths. FIG. 13d shows a matrix of conductive traces (133) and (135) which provide for closure of circuit contacts when the key (130) is pressed. FIGS. 13e, 13f and 13g show details of the three nonconductive layers shown in FIG. 13a which are the top nonconductive layer (132) with conductive traces (133), the spacer (134) and the bottom conductive traces (135) on the bottom nonconductive layer (136).

Figure 16:
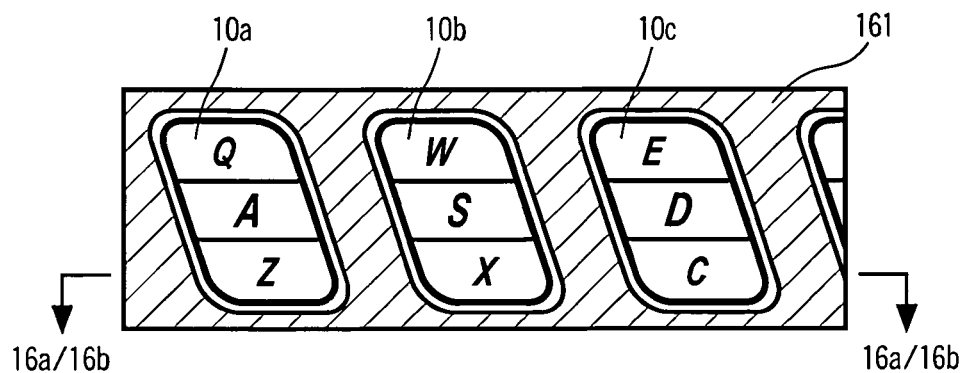
FIG. 16 shows the keyboard of FIG. 1 further including a top face plate.
Figure 16A:
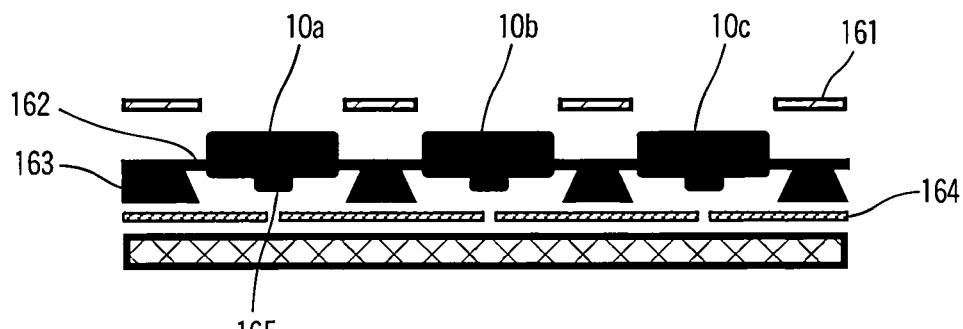
FIG. 16a shows an expanded cross-sectional view of the keyboard assembly of FIG. 16.
Figure 16B:
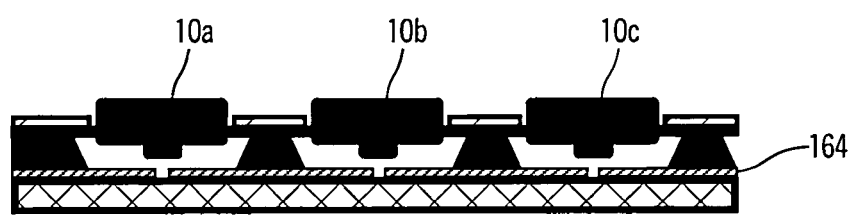
FIG. 16b shows a cross-section of the keyboard of FIG. 16 when assembled. In this embodiment, switching occurs by the use of conductive feet and conductive copper traces as shown in FIG. 16b.

FIG. 16 shows a view of the keys 10a-10c shown in FIG. 1. In FIG. 16, there is also shown a top face plate (161) which provides for separation of the keys and rigidity along the top surface of the keyboard. The keys 10a, 10b, 10c are connected together by an interstitial membrane material (162). Beneath a central portion of each membrane interstice is a support (163). In the embodiment shown in FIG. 16, copper traces (164) are provided for switching. The switching is completed by closure of switches formed by the copper traces by conductive contact feet (165) such as that shown at 10a in cross-sectional FIG. 16a. When the keyboard assembly is finally assembled, the membrane supports (163) provide support for the membrane (162) and the top face plate (161) as shown in FIG. 16b. However, the keys 10a, 10b, 10c do not engage copper traces (164) until they are depressed. The keys in FIG. 16b are shown in the non-depressed state. In this embodiment, the connecting membrane provides for return of the keys to the position of non-contact. Similar membrane and membrane supports may be used in the other embodiments of this invention to provide for spacing when keys are not depressed, and to provide a return action to return the keys to the non-depressed position after being pressed.

The three-position and six-position key actuated switches of this invention comprise keys which are depressed to actuate switch contacts as shown in the preferred embodiments. Although the key actuated switches are disclosed for use in a keyboard, they may also be used in other applications such as control switches for many uses such as appliances, automotive dashboards, or for any other electrically controlled device. They may also be used for any other information input device and they are not limited to use with keyboards.

Although three-position keys and six-position keys are shown as the preferred embodiments of this invention, other numbers of positions can be constructed using the teachings of this invention. A three-position key may be converted into a four position key by adding another group of feet having a fourth height to provide a third tilt axis in parallel with the two shown in the preferred embodiments. A key with five positions may be constructed by deleting one of the five tilt axes shown in the preferred embodiments of six-position keys. A key with two positions may be constructed by deleting one tilt axis from any of the three-position key embodiments. Keys having more than six positions may be constructed following the principles set forth in the preferred embodiments.

Figure 17A:
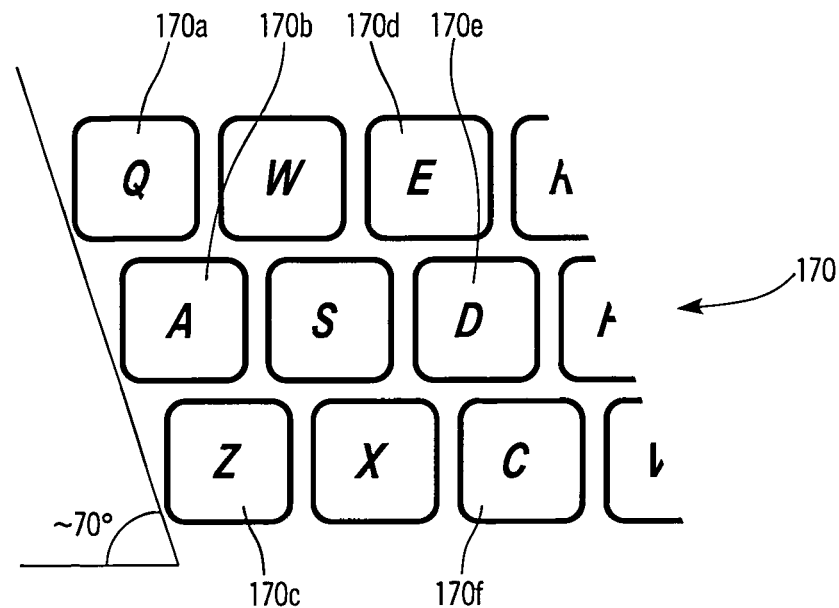
FIG. 17a is a fragmentary, plan view of a standard QWERTY keyboard showing the angle at which the keys are arranged to be vertically slanted.

FIG. 17a shows a partial view of a standard, full-size QWERTY keyboard (170), from the left side. As shown in FIG. 1, the standard QWERTY keyboard arrangement has the keys with letters arranged in three rows by nine columns, plus the "P" key. However, the keys in these columns are not perfectly vertically arranged above and below each other. In other words, the key columns do not form a 90 degree angle with the horizontal or lateral direction across the keyboard; they are slightly "slanted" to the left. Herein, it should be understood that the term "horizontal" means the lateral direction across the length of the keyboard, and the term "vertical" means the direction on the keyboard that is orthogonal to the horizontal or lateral direction. FIG. 17a shows the angle measurement indicating that the angle of these columns of three keys, such as Q (170a), A (170b), and Z (170c), or E (170d), D (170e) and C (170f), is typically roughly 70 degrees from the horizontal.

Figure 17B:
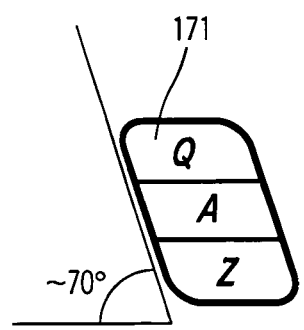
FIG. 17b is a plan view of an individual multi-position key having a vertical slant.

FIG. 1 also shows that the multi-position keys have their letters arranged in those same columns corresponding to the QWERTY pattern or arrangement of letters on a standard keyboard. In the preferred embodiments, as shown in the drawings, and in particular the keyboard layouts of FIGS. 1, 20-26a, 27a, 28b and 30c, the multi-position keys are also slightly slanted to the left, at the same 70 degree angle as formed by the key columns of a standard QWERTY keyboard. In FIG. 17b, key "QAZ" (171) is illustrated as an example, showing its slant at a 70 degree angle from the horizontal.

This slanting of the multi-position keys, and hence the columns of letters on those keys, in an identical manner to that of a standard QWERTY keyboard, is advantageous to touch typists, since their fingers are trained to move to access the letters in those positions. For example, the small finger on the left hand is trained to move up and to the left, from the home key A, to type Q, and down and to the right, from the home key A, to type Z.

On a standard QWERTY keyboard, each letter is assigned to its unique key, and a single instance of a letter is produced each time that letter's key is pressed. Similarly for the keyboard of this invention, each letter is assigned to its unique key position, and a single instance of a letter is produced each time the letter's key position is pressed. Thus, there is a one-to-one correspondence between the number of instances of a letter and the number of times that its key position is activated. Pressing a letter's key position one time produces a single instance of that unique letter; pressing that same key position 'n' times produces 'n' instances of that letter. This one-to-one correspondence is an important aspect of true touch typing, wherein the typist is trained to activate a single letter position on the keyboard rapidly as each letter of the word being typed is identified by the typist. This differs from prior art approaches in which multiple letters appear on a key and the key must be pressed multiple times in order to cycle through its various letters to select the desired letter. It also differs from approaches in which software algorithms are employed to attempt to guess or predict which letter the user desired from among the letters appearing on the key that was pressed.

Figure 18A:
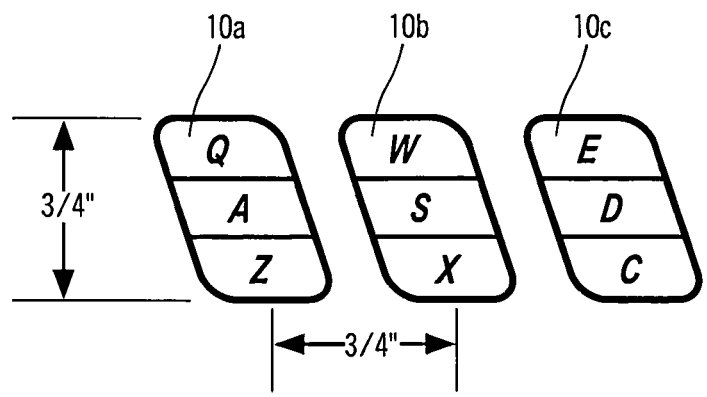
FIGS. 18a and 18b are plan views showing measurements for key length and inter-key spacing.
Figure 18B:
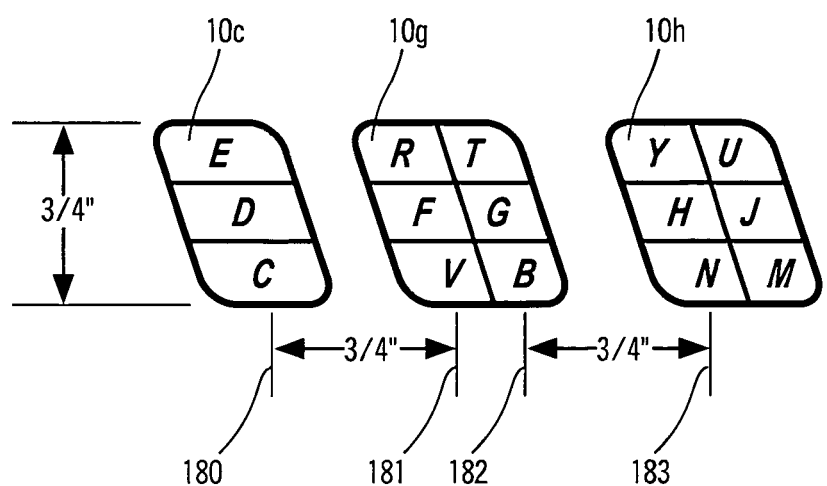

FIGS. 18a and 18b show measurements for key length in the vertical direction on the keyboard and the lateral inter-key spacing in a preferred embodiment. The center-to-center inter-key spacing between any two 3-position keys, such as (10a) and (10b) shown in FIG. 18a, is preferably ¾". This corresponds to the industry standard center-to-center inter-key spacing between single-position keys in a full-size, standard QWERTY keyboard. This spacing is sized to keep the fingers from interfering with one another, and also to keep a finger, by virtue of its size with respect to the size of the keys, from pressing two or more keys at the same time. Accordingly, the keys on the keyboards herein are spaced sufficient to avoid hitting multiple keys with one finger, which makes the keyboards well-suited for touch typing. It is only the extent of finger movements during typing that is affected. In other words, the finger movements along a key are substantially the same as in touch typing with a standard QWERTY keyboard except that the fingers do not have to travel as far or transfer from one key to the next. The horizontal width of the 3-position keys is approximately the same as that of keys of a standard, full-size keyboard, i.e., approximately ½".

For the 6-position keys (10g) and (10h) shown in FIG. 18b, the inter-key spacing takes into account the two columns of letters, hence columns of positions, these keys have, essentially giving them each two "centers," based on the location of the columns of letters (and positions). FIG. 18*b* shows these two "centers" for key (10*g*); the center for the left column "RFV" (181) and for the right column "TGB" (182). Thus, the inter-key spacing between 6-position key (10*g*) and 3-position key (10*c*), which is to its left, is ¾" between the "left center" (181) of (10*g*) and the center (180) of (10*c*). The inter-key spacing between 6-position key (10*g*) and 6-position key (10*h*), which is to its right, is ¾" between the "right center" (182) of (10*g*) and the "left center" (183) of (10*h*). The horizontal width of the 6-position keys is slightly less than the key length of ¾" to be slightly larger than the width of keys of a standard, full-size keyboard, i.e., approximately ⅝".

Figure 18C:
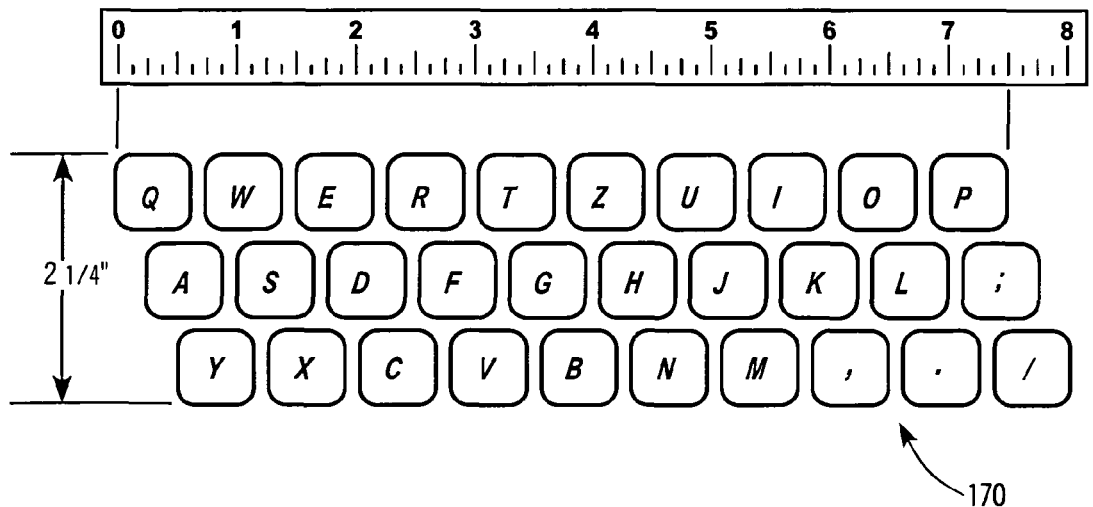
FIGS. 18c and 18d are plan views showing measurements for a standard, full size keyboard and the keyboard having multi-position letter keys, respectively.
Figure 18D:
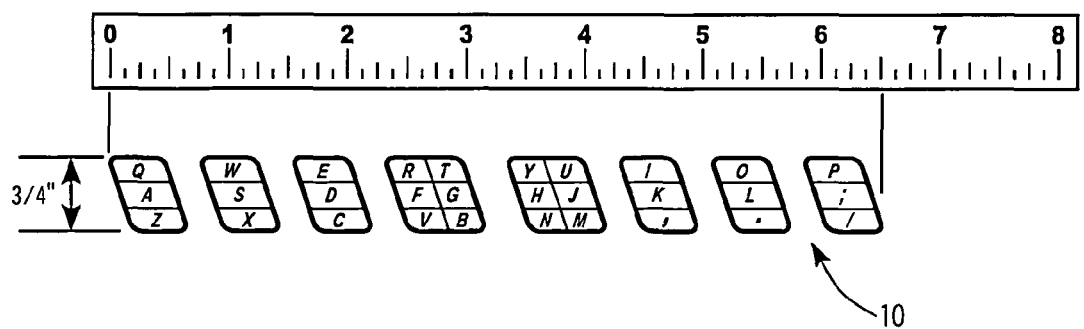

Referring to FIGS. 18*c* and 18*d*, which are shown approximately to scale with one another, it can be seen that with the keyboard arrangement and preferred key sizes discussed above, the present keyboard 10 is significantly more compact than the full-size keyboard 170, particularly in the vertical direction. In this regard, the keyboard 10 only uses one-third the amount of space for its keys over that used in keyboard 170 in the vertical direction, i.e. ¾" vs. 2¼". In the horizontal direction space savings are also realized since the four center columns of keys of the standard keyboard 170 are combined into the two, central 6-position keys of the keyboard 10. In keyboard 170, the space required for those central columns is approximately 2¾" in the horizontal direction. While in keyboard 10, the space required for the two 6-position keys is approximately 1⅝". As such, the overall horizontal space required for the letter keys is reduced from slightly greater than approximately 7½" on standard keyboard 170 to approximately 6½" in keyboard 10. It can be seen that the present reduced size keyboard 170 is well suited for being integrated into a compact, mobile computing device such as those shown in FIGS. 29-30*d* and discussed hereinafter, while also enabling users to touch type therewith.

With respect to touch typing, the keyboard 10 permits touch typing in much the same manner as keyboard 170 except that a typist does not need to move their fingers between keys to type letters and does not need to move their fingers as far to type different letters. Generally, in horizontal and vertical directions, normal touch typing on a standard keyboard 170 requires a typist to move their fingers approximately ¾" of an inch to type different letters with the finger dedicated to typing those letters. By contrast, with keyboard 10, the typist generally can move their fingers approximately ¼" of an inch to type a different letter in the vertical direction along the 3-position keys, and approximately ⅜" of an inch to type a different letter in the horizontal direction along the 6-position keys.

A thickness for the multi-position keys of this keyboard, and corresponding small raised height above the base of the keyboard allows it to have a compact size, suitable for numerous applications for portable devices where a full-size keyboard would not fit. Also, since the present keyboard does not require that fingers move to operate multiple keys for touch typing letters, there is no need to have the thickness or raised height, such as at the key edges, between adjacent keys vary. In other words, the height of the adjacent keys at corresponding, adjacent lateral edges can be the same as the rest of the key since there is no benefit to reducing the height to more easily permit fingers to move between the letter keys as such movement for touch typing letters need not occur with the keyboard arrangement described herein.

Figure 19A:
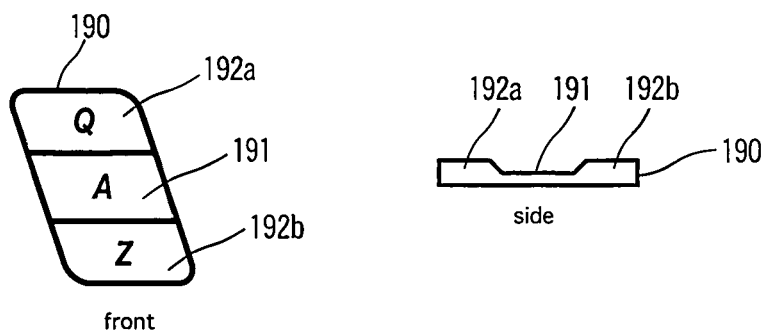
FIGS. 19a-19c show three different key configurations that each have a physically distinct home row position on the multi-position keys.

FIG. 19*a* shows 3-position key (190) in both front and side views. To assist the touch typist to type on this keyboard without looking at the keys, surface features are provided to permit the typist to tactilely identify when the fingers are on the home row. For the eight multi-position keys of this invention which contain letters, the home row corresponds to the key positions that contain letters A S D F G H J K L and ";", just as on a standard QWERTY keyboard. Accordingly, this home row coincides with or intersects the vertical center of the letter columns on the multi-position keys. On key (190), A is on the home row. The side view of FIG. 19*a* shows that the key has a lowered channel (191) running horizontally or laterally across its middle, defined by two raised surfaces (192*a*) and (192*b*) at the upper and lower laterally extending sides thereof. The lowered channel flat surface and raised surfaces let a user identify when the finger is on that key's home row letter, i.e., channel (191).

Figure 19B:
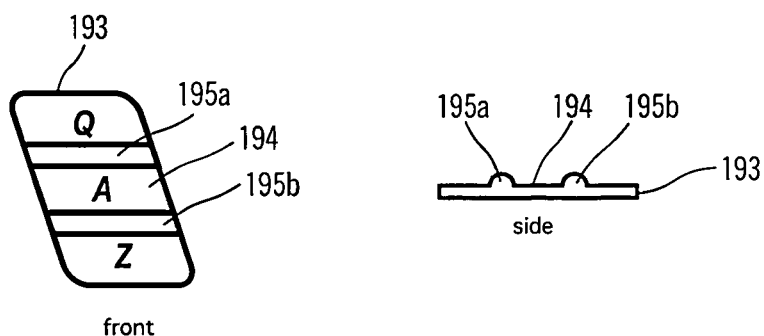

Various other key surface features could also be provided to assist in tactile identification of the home row. FIG. 19*b* shows another possible 3-position key (193) in both front and side views. The side view shows two raised semi-cylindrical bars (195*a*) and (195*b*) traversing horizontally across the face of the key. Home row letter position (194), in this embodiment, is created by the flat surface between these two raised bars. When a user's finger is on surface (194), it can feel bar (195*a*) above it and simultaneously bar (195*b*) below it, and thus can tactilely identify the home row letter position.

Figure 19C:
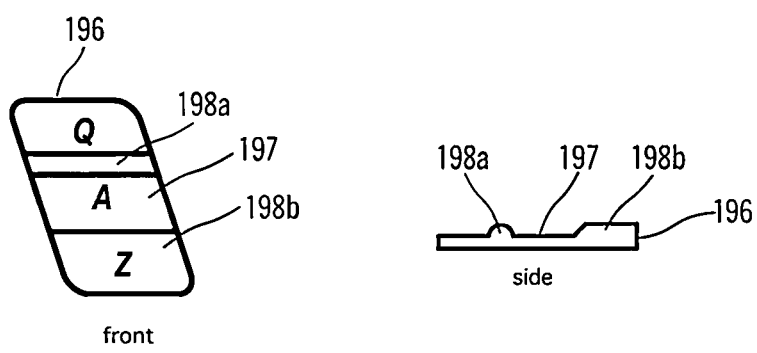

FIG. 19*c* shows that a home row letter area (197) on key (196) can also be achieved by combining a bar (198*a*) across the key on one side of the home row area, and a raised surface (198*b*) on the other side of the home row area.

As previously discussed, the key configurations, such as shown in FIGS. 19*a*-19*e*, of adjacent letter keys do not need to be varied to more easily permit finger movements between these keys since such movements are obviated with the keyboard arrangements described herein.

Figure 20:
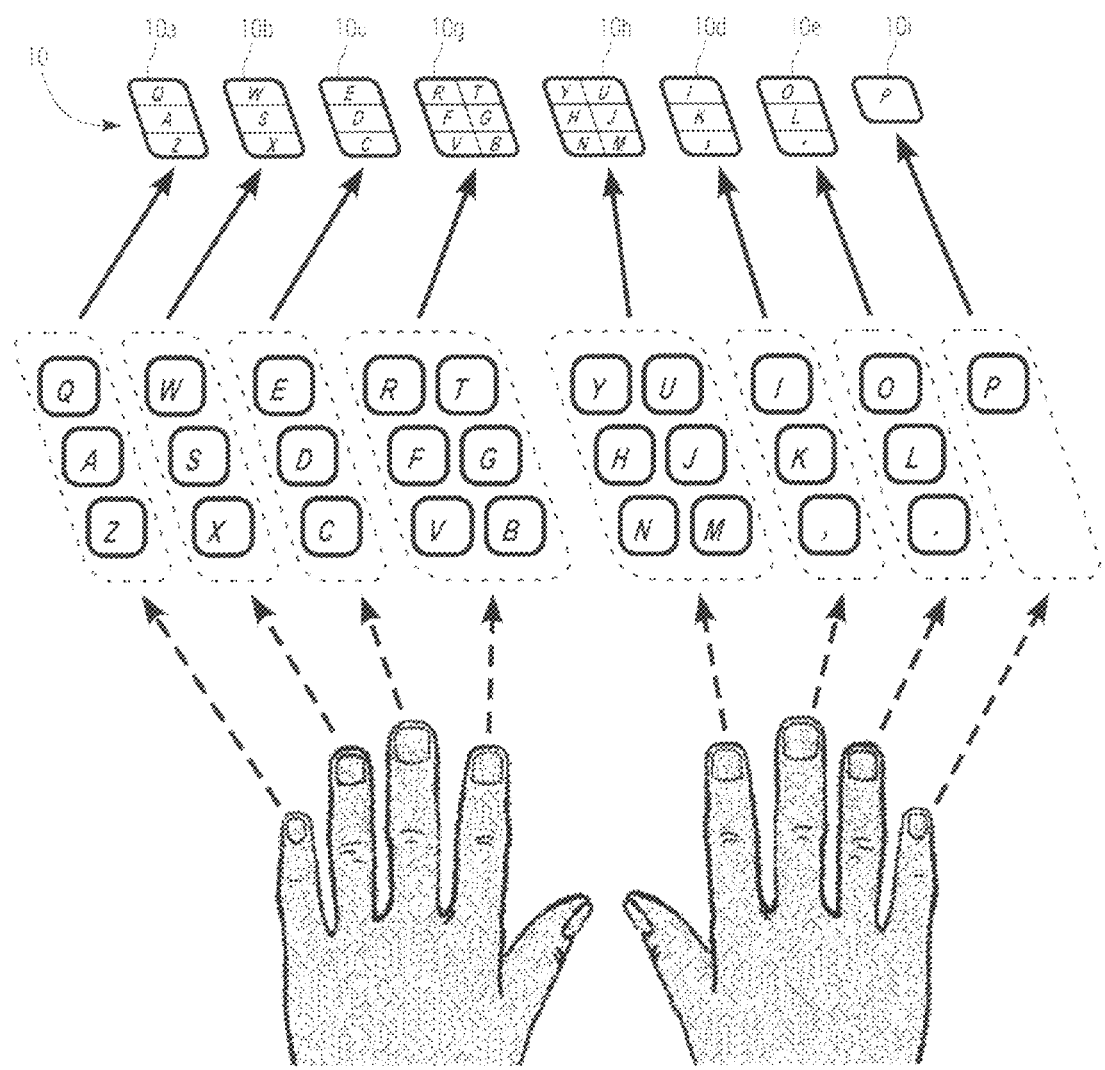
FIG. 20 shows a keyboard having seven multi-position keys, plus one single-position key for the letter P.

FIG. 20 shows a keyboard (10) containing seven multi-position keys plus one single-position key. The keyboard (10) has a first group of three-position keys, (10*a*), (10*b*) and (10*c*) and second group of three-position keys (10*d*) and (10*e*). The keyboard further contains a third group of six-position keys, (10*g*) and (10*h*). In addition, the keyboard also contains one single-position key, (10*i*).

As with the other embodiments, for touch typing, each of these eight keys is operated by one of the eight fingers, i.e. the finger dedicated to the letters on that key when touch typing using the standard QWERTY keyboard layout. It should be noted that for touch typing letters on QWERTY keyboards, the thumbs typically are not used. Thus, when discussing a user's fingers herein, this generally does not refer to the thumbs. Since the little finger of the right hand types only the letter "P" when touch typing, the key it operates (10*i*) can be a single-position key; if desired, the punctuation symbols normally accessed by that finger can be put on one or more different keys.

Figure 21:
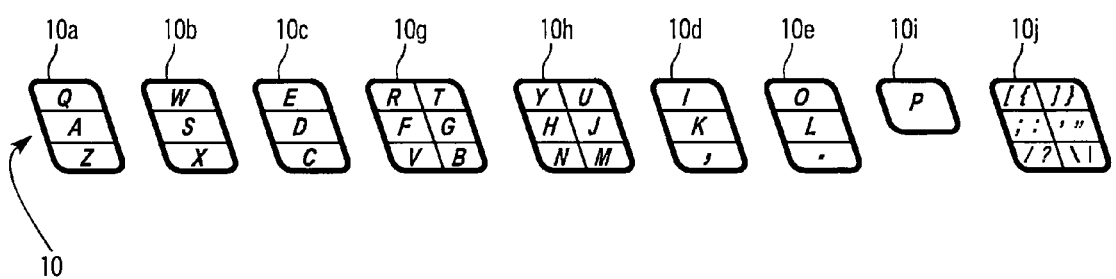
FIG. 21 shows a keyboard containing seven multi-position keys, plus one single-position key for the letter P, plus an additional multi-position key for various punctuation symbols.

FIG. 21 shows an example of such a configuration: the eight keys (10*a*)-(10*e*), and (10*g*)-(10*i*), of keyboard (10) collectively containing letters A-Z in a QWERTY pattern, plus a ninth key (10*j*) located laterally to the right of those eight keys. This multi-position key (10*j*) is shown containing additional punctuation symbols present on standard typing keyboards.

Figure 22A:
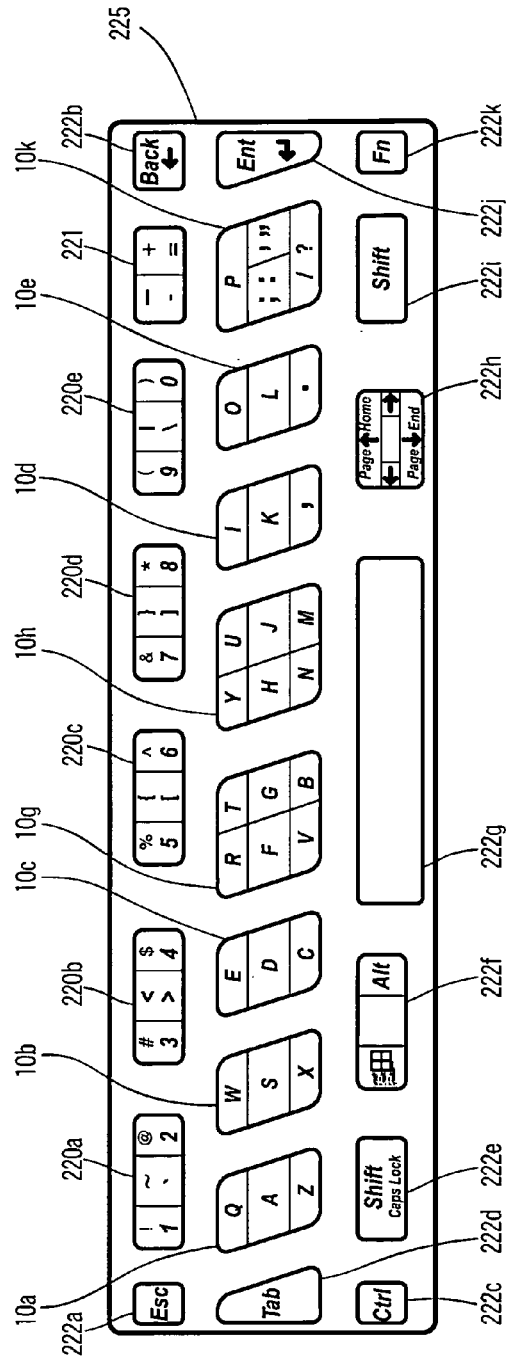
FIG. 22a is a plan view of a keyboard showing eight multi-position keys having all the letters A-Z in a standard QWERTY arrangement thereon and a row of multi-position number keys to allow touch typing therewith.

FIG. 22*a* shows an example configuration of the keyboard (225), illustrating additional keys that may be included in a possible commercial application of a full-function keyboard for use with a computing or communication device. This keyboard contains letters A through Z arranged in a QWERTY keyboard pattern on eight multi-position keys, consisting of five 3-position keys (10a)-(10e), two 6-position keys (10g)-(10h), and one 4-position key (10k).

Figure 22B:
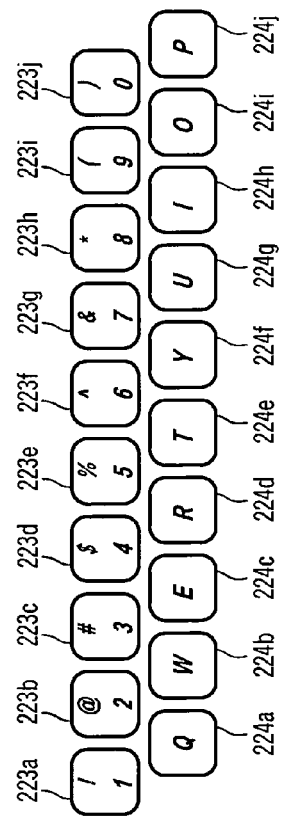
FIG. 22b is a plan view of a standard QWERTY keyboard showing the typical relationship of number keys and the upper row of letter keys.

FIG. 22a shows a preferred arrangement of a horizontal row of five 3-position keys (220a)-(220e) located above those eight multi-position keys. These five keys collectively contain the digits 0-9, as well as various punctuations and symbols. In order for the keyboard (225) to allow touch typists to type numbers, as well as letters, without looking at the keys while they type, the number keys preferably have substantially the same positional relationship to the top row of letters as is found in a standard QWERTY keyboard. This relationship is illustrated in FIG. 22b, which shows the top row of letter keys (224a)-(224j), and above it the row of ten keys (223a)-(223j) that contain numbers, as they are arranged in a standard QWERTY keyboard. These additional multi-position keys are elongated horizontally.

As shown in FIG. 22a, the use of 3-position keys (220a)-(220e) allows for two things: it allows for the punctuations and symbols shown on the center position of those keys to fit in the same row as the number keys, and at the same time it allows for the proper placement of the digits 0-9 with respect to the top row of letters on keys (10a)-(10e), (10g), (10h) and (10k), in general conformance with their locations on a QWERTY keyboard. In other words, the numbers are disposed at generally the same relative position on the keyboard with respect to the letters as they would be in a standard QWERTY keyboard arrangement. For example, "1" on key (223a) is above and to the left of Q, key (224a), in FIG. 22b, and similarly "1" on key (220a) is above and to the left of Q on key (10a), in FIG. 22a. The "6" on key (223f) is above and between T, key (224e), and Y, key (224f) in FIG. 22b; similarly, "6" on key (220c) is above and between T on key (10g), and Y on key (10h) in FIG. 22a. Continuing the comparison between the keyboard layouts or arrangement of FIGS. 22a and 22b, the letter I is laterally or horizontally between but below the numbers 8 and 9 to either side thereof in the row of number keys. Likewise, the letter O is generally laterally between the numbers 9 and 10, albeit offset by a row of keys.

If the five 3-position keys (220a)-(220e) were instead fifteen single position keys, they could not fit in a single row without making the size of the keys and/or the inter-key spacing very small. This would make it difficult for the typist to avoid hitting two keys at the same time. Alternatively, these keys would have to be located in two separate rows, or elsewhere on the keyboard, with both alternatives making the keyboard substantially larger, reducing its ability to fit in most mobile computing devices.

A 2-position key (221) provides the symbols "–", "_", "=" and "+". Combined with the punctuations and symbols on keys (221) and (10k), this design of using 3-position keys (220a)-(220e) provides the full compliment of punctuations and symbols found on most full-size standard QWERTY keyboards, and allows an extremely compact and small design of just two rows of keys to contain all letters, numbers, punctuations and symbols. As a variation on this design, 2-position key (221) and single-position key (222b) could be combined into one 3-position key; this would result in a top row consisting of 6 3-position keys, plus single-position key (222a).

Additionally, FIG. 22a shows eleven keys (222a)-(222k) at various locations, which perform non-character typing functions, such as Shift, Tab, Space, Control, etc. The top symbols on keys (220a)-(220e) and (221), such as the "$" above the "4" on (220b), are accessed by pressing that key location while holding down the Shift key (222g).

Figure 23:
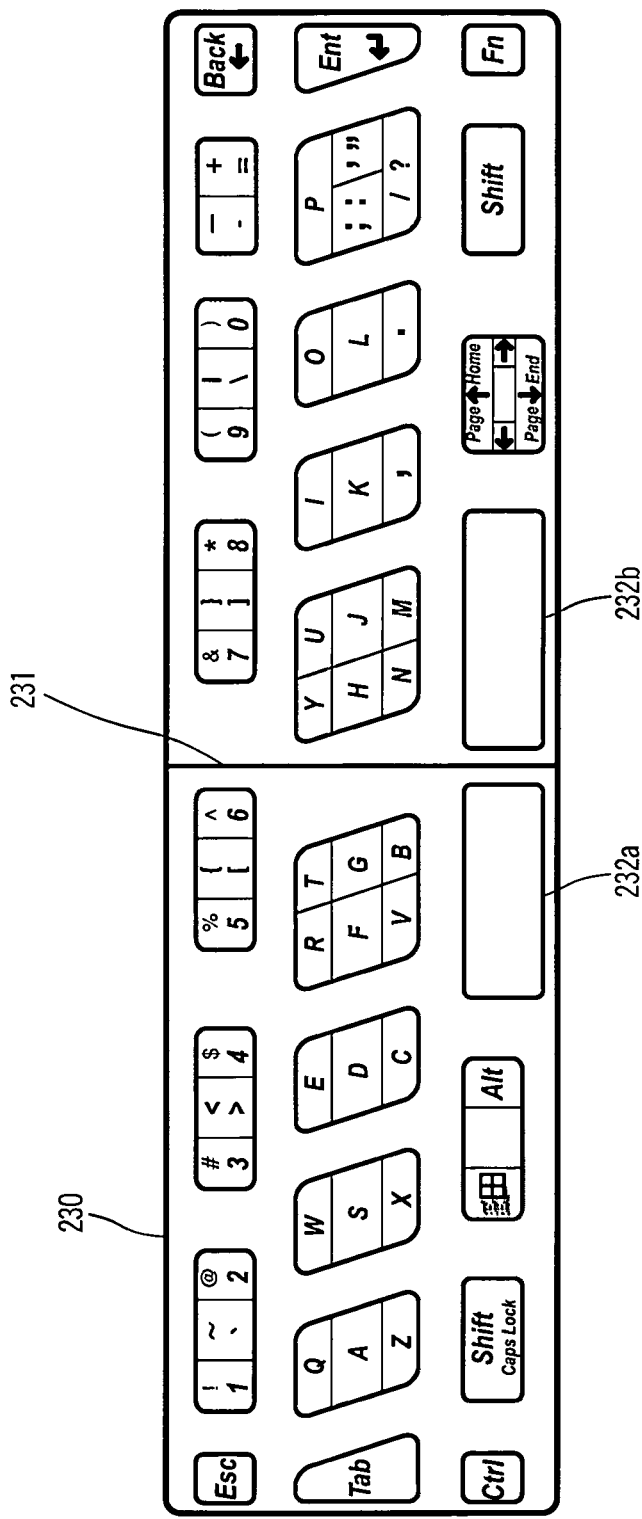
FIG. 23 shows a keyboard that is bisected vertically, the two halves being attached by a hinge.

FIG. 23 shows an example configuration of the keyboard (230), similar to FIG. 22a, except the keyboard (230) is bisected vertically, the two halves being attached by a hinge (231) or some other mechanism which would allow for it to fold. Also, the space bar is divided into two sections (232a) and (232b). Physically dividing keyboard (230) into two horizontal halves attached by a hinge, and also dividing the space bar into two sections, one residing on each half of the keyboard, allows this keyboard to be folded over into half its original horizontal width. This would be useful, for example, in the application of a stand-alone peripheral keyboard which one could easily carry in a shirt pocket, and unfold to use with a small mobile device via a wireless or cable connection. Alternatively, the keyboard could be formed of a flexible material to allow it to be folded up or collapsed into a compact configuration in any number of different manners.

Figure 24:
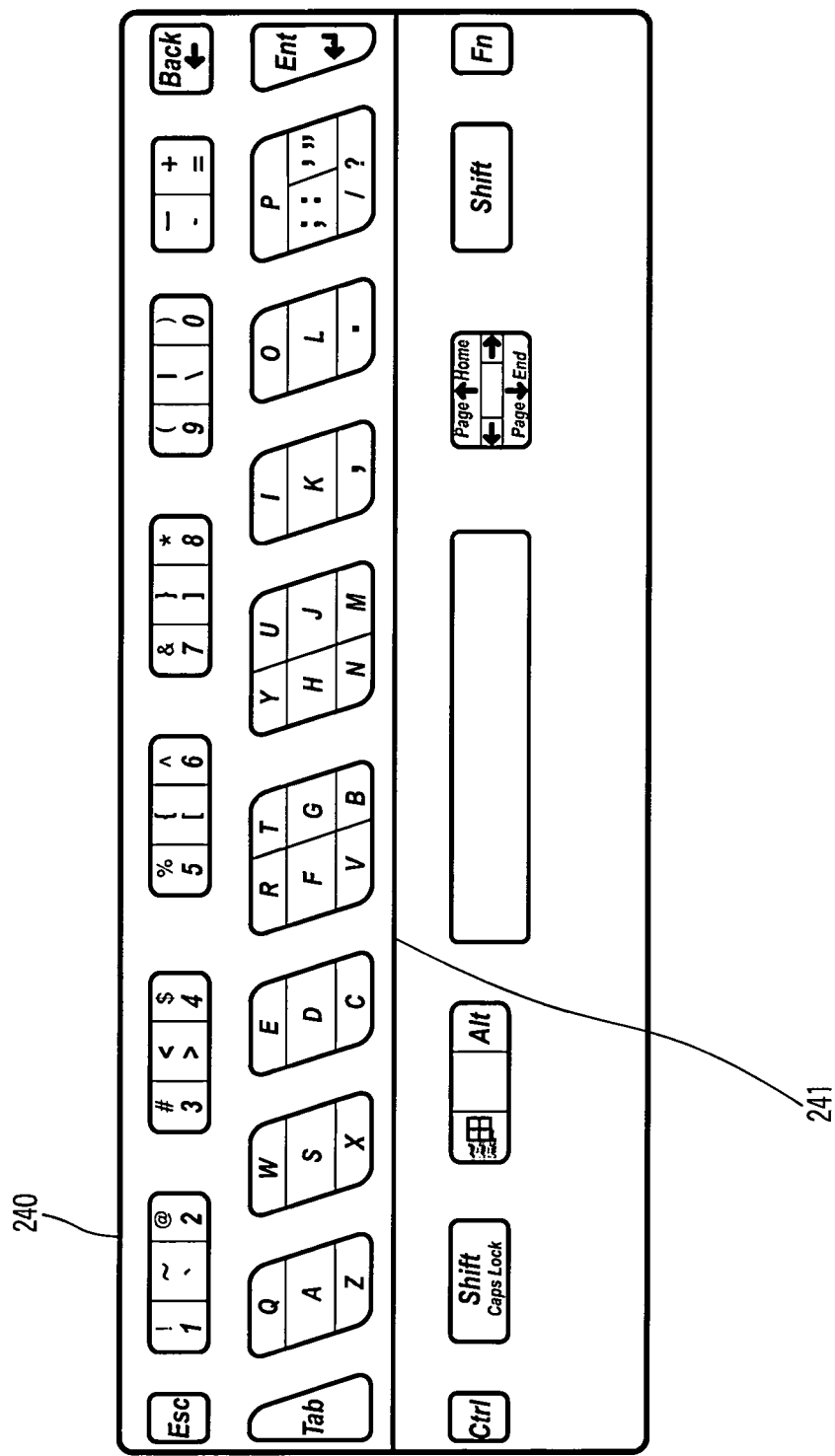
FIG. 24 shows a keyboard that is bisected horizontally, the two halves being attached by a hinge.

FIG. 24 shows an example configuration of the keyboard (240), similar to FIG. 22a, except the keyboard (240) is bisected horizontally, the two halves being attached by a hinge (241) or some other mechanism which would allow for it to fold. Physically dividing keyboard (240) into two vertical halves attached by a hinge allows this keyboard to be folded over into half its original vertical height. This would be useful, for example, in an application where the keyboard could be built into the frame below the display screen of a very small mobile device, since the size of the frame could be reduced to house the keyboard in its folded position. The keyboard could then fold out from the bottom when typing input is desired, as shown in FIGS. 30c and 30d.

Figure 25A:
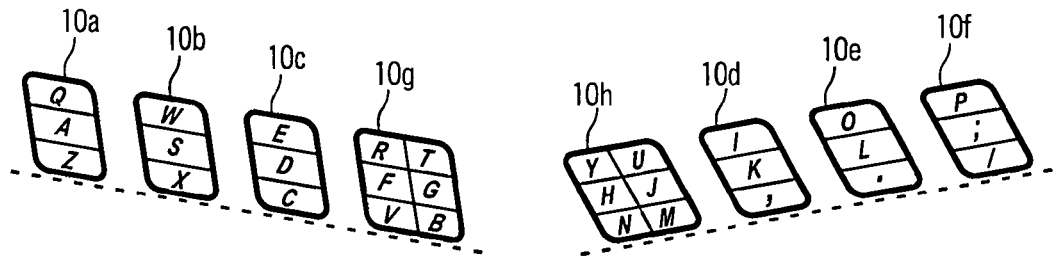
FIGS. 25a-25c show arrangements of the eight multi-position keys on the keyboard divided into two groups of four keys, each group being arranged along an angled path or a curve.
Figure 25B:
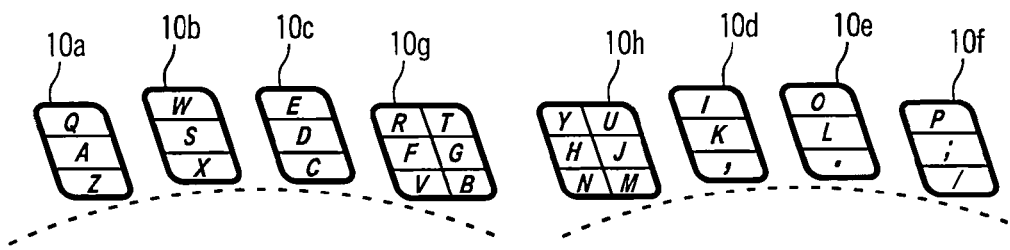
Figure 25C:
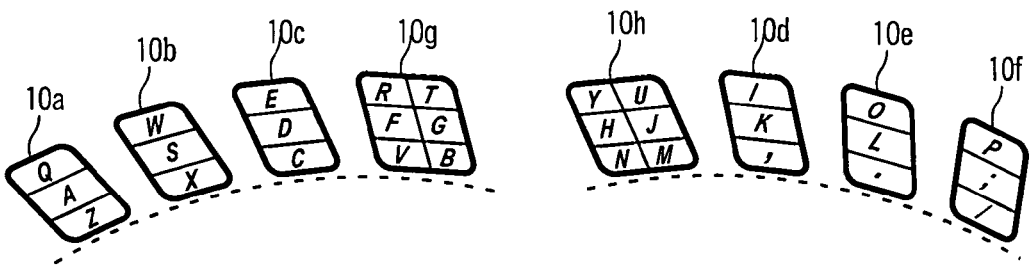

FIGS. 25a-25c show how the eight multi-position keys (10a)-(10h) of this invention could be divided into two groups of four keys each (one group of keys per typing hand), and the keys in each group could be arranged in different configurations for keyboards designed with ergonomic considerations in mind.

FIG. 25a shows the keys arranged along slanted straight lines in a "V" configuration, similar to many "split" ergonomic computer keyboards on the market today. As shown, the bottoms of two groups of the keys are aligned along oblique reference lines that extend at an oblique angle to the horizontal, but in opposite directions.

FIGS. 25b and 25c show the keys arranged along curved reference lines to better correspond to the natural curved path the fingertips of the hand create when laid on a flat surface in a relaxed position. FIG. 25b shows the keys in a curved arrangement with their bottom edges remaining horizontal; FIG. 25c shows the keys with their bottom edges aligning with the arc of the curve. Thus, in FIG. 25b, in each key group, the two adjacent middle keys are horizontally aligned and vertically offset from the two, horizontally aligned outer keys. On the other hand, in FIG. 25c, none of the keys in a group is horizontally aligned with another key in the group.

Figure 26A:
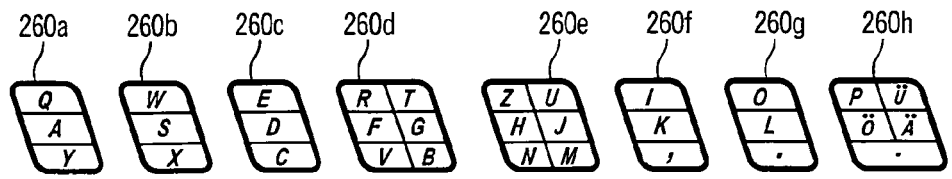
FIGS. 26a and 27a show examples of international standard variants of the QWERTY configuration employed on eight multi-position keys.
Figure 26B:
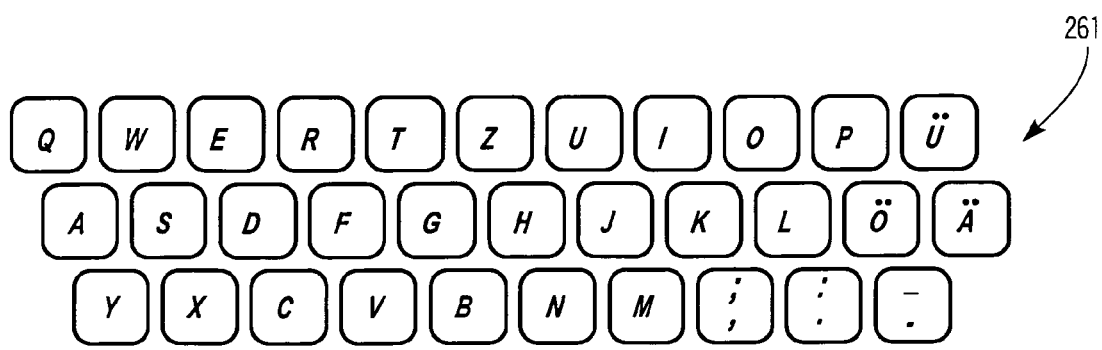
FIGS. 26b and 27b show the standard German "QWERZ" keyboard arrangement and French "AZERTY" keyboard arrangement, respectively.
Figure 27A:
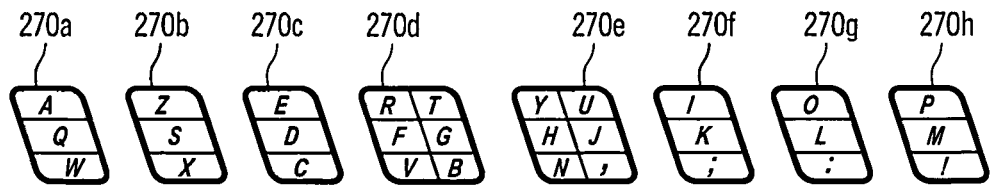
Figure 27B:
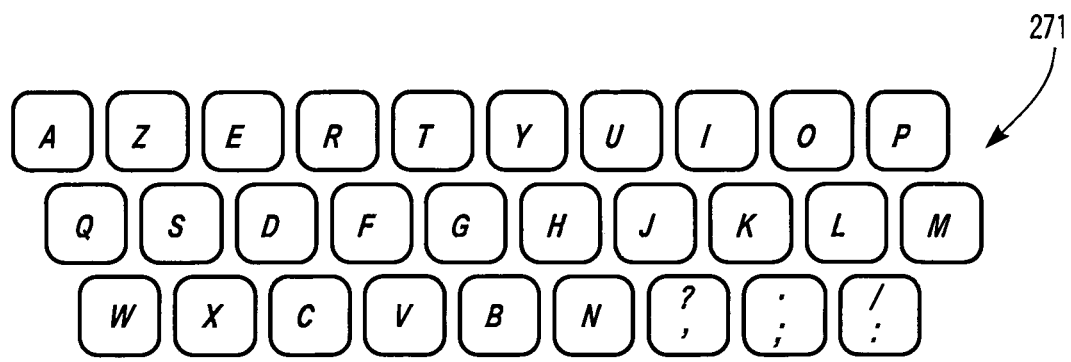

FIGS. 26a and 27a show examples of international standard variants of the QWERTY configuration that could be adapted to provide the same advantages as the QWERTY keyboard layouts described herein. FIG. 26a shows the German "QWERTZ" arrangement on the eight multi-position keys (260a)-(260h); FIG. 26b shows the German standard "QWERTZ" arrangement on a full-size keyboard (261). FIG. 27a shows the French "AZERTY" arrangement on the eight multi-position keys (270a)-(270h); FIG. 27b shows the French standard "AZERTY" arrangement on a full-size keyboard (271). Likewise, the present keyboard arrangement is equally suited to accommodate any number of other standard touch typing arrangements for various alphabets beyond the English, German and French alphabet keyboard arrangements described herein.

Accordingly, standard keyboard arrangements of full alphabets used for non-English languages arranged on eight keys, such as alphabets that employ more than 20 letter characters on their standard keyboards, can be implemented in the same predetermined standard arrangement on these keyboards but on only eight keys. In this manner, touch typists of these languages can also use these keyboards, such as the German and French standard keyboards of FIGS. 26*a*, *b* and 27*a, b*, without having to move individual fingers from one key to another. The only change would be a recalibration of the extent of finger movements along the key with which a finger is associated, as has previously been described. In this regard, the fingers need not necessarily move along the key to be able to push the key for typing a different letter but may be able to simply direct an actuation force in the direction the finger would normally move during touch typing on a regular sized or standard keyboard.

Figure 28A:
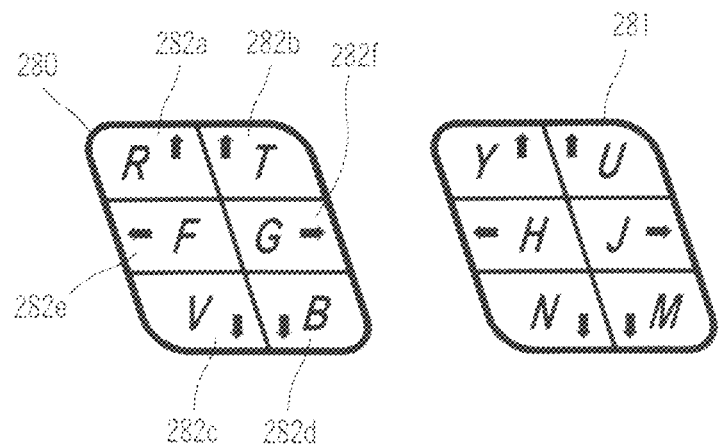
FIG. 28a shows six-position keys used as cursor control (up, down, left, right) keys in addition to use of the keys for typing letters.
Figure 28B:
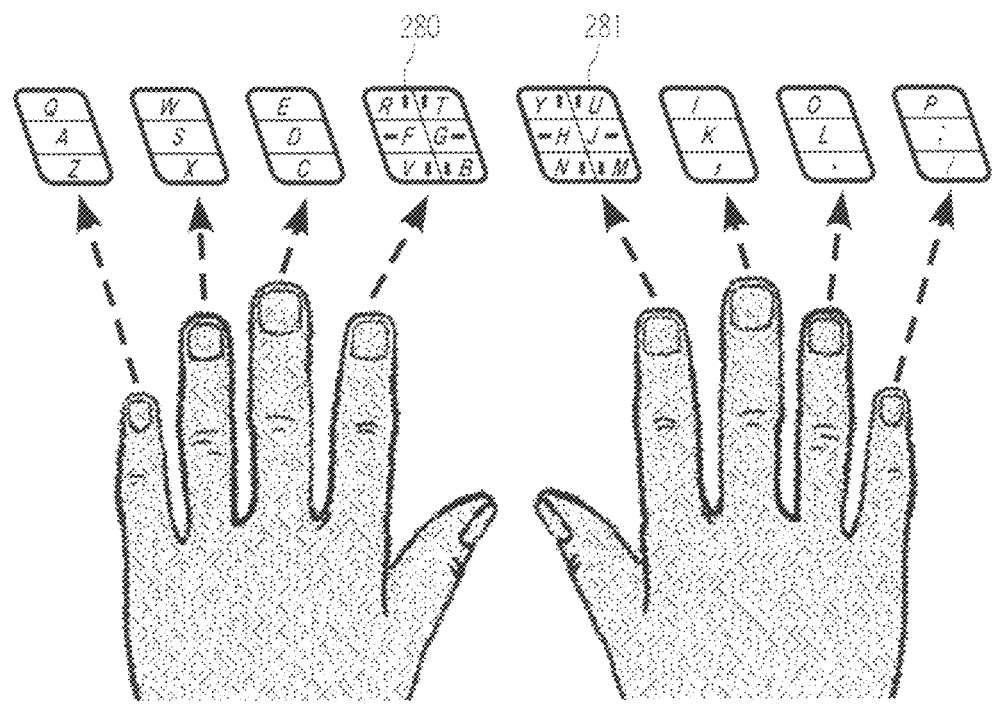
FIG. 28b shows the six-position keys of FIG. 28a in a keyboard with other multiple-position keys arranged as in the keyboard of FIG. 1.

FIG. 28*a* shows six-position keys (280) and (281), with an arrow indicator on each position in addition to a letter. These keys could both, or separately, have the added function of cursor movement. Thus, on key (280), pressing positions (282*a*) or (282*b*) would move the cursor up, pressing positions (282*c*) or (282*d*) would move the cursor down, pressing position (282*e*) would move the cursor to the left, and pressing position (282*f*) would move the cursor to the right. Shifting a key position to cursor functionality, instead of registering a letter when pressed, could be enabled by a "function" key, such as key (222*k*) in FIG. 22*a*, or could be selectively activated by software, such as when a computer is running a gaming program. FIG. 28*b* shows how keys (280) and (281) are used by the index fingers. Since the index finger has the best dexterity and most fine-tuned coordination of the fingers, providing the index finger(s) with cursor control could be advantageous during the course of typing, or playing a computer game.

Figure 29:
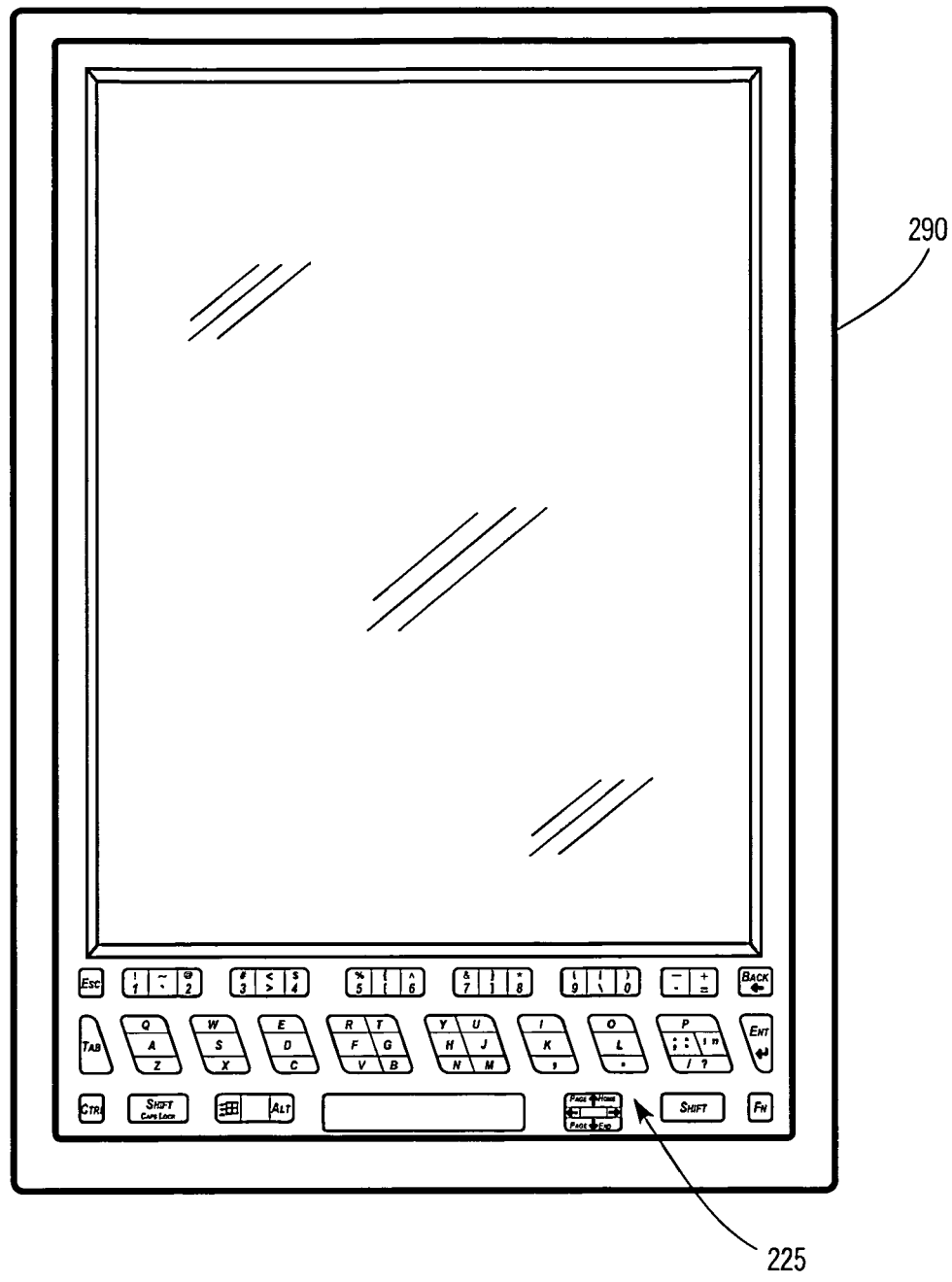
FIG. 29 shows the keyboard of FIG. 22a built into the frame of a Tablet PC.

FIG. 29 shows an example of how the keyboard (225) in FIG. 22*a* could be built into the frame of a Tablet PC (290). The Tablet PC supports handwriting recognition using a stylus to write text on the screen, but this is slow, cumbersome, and less than 100% accurate. Despite the Tablet PC's design objective of being a full personal computer housed within a thin enclosure containing a display screen, it currently is actually a two-piece device: it requires a separate full-size peripheral keyboard, or docking station which contains a keyboard, to provide the user with a practical method of inputting text. These add-on keyboards make the Tablet PC bulkier, heavier, and require sliding, folding, and/or rotating the keyboard to alternate between text entry via the keyboard and freeform drawing with the stylus on the screen.

The Tablet PC of FIG. 29 has a one-piece enclosure housing all internal hardware and software components. With its small size and footprint, the keyboard (225) can be built right into the one-piece enclosure of the Tablet PC below the display screen thereof, allowing the Tablet PC to achieve its design objective of a one-piece, slim, easily potable form factor, and still allow rapid two-hand touch typing for text input. Additionally, the user can effortlessly alternate between stylus drawing and keyboard typing without the constant cumbersome repositioning of an external keyboard.

FIGS. 30*a*-30*d* show an Ultra-Mobile PC ("UMPC") (300), and illustrate how a folding keyboard (301) of the type shown in FIG. 24 could be built into its frame, below the display screen. Essentially, the UMPC is a smaller, much more portable version of the Tablet PC, but, like the Tablet PC, is a hardware platform for a full personal computer operating system. Like the Tablet PC, it supports handwriting recognition using a stylus to write text on the screen, but in practice requires a separate external keyboard as a truly practical method of text input.

FIGS. 30*a* and 30*b* show front and side views, respectively, of a UMPC with the keyboard (301) in the "closed" position: this allows for easy carrying of the UMPC, and hides the keyboard when it's not required, such as for watching a video on the display. FIGS. 30*c* and 30*d* show front and side views, respectively, of the UMPC with the keyboard in the "open" position-folded down from the bottom. This allows rapid two-hand touch typing input for word processing, spreadsheets, email, and any other such applications.

As these examples demonstrate, the small footprint and variable form of the keyboard disclosed makes it ideally suited for integration into a variety of mobile computing devices.

Figure 31:
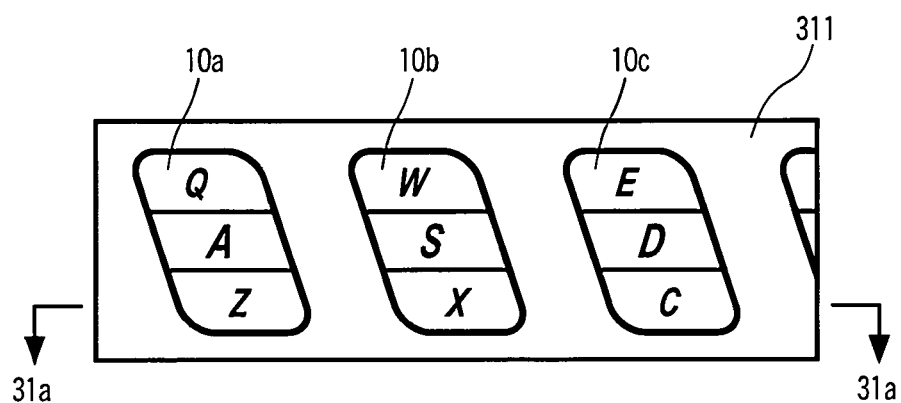
FIGS. 31 and 31a show a portion of a keyboard including a thin, flat sheet member having keys thereon.
Figure 32:
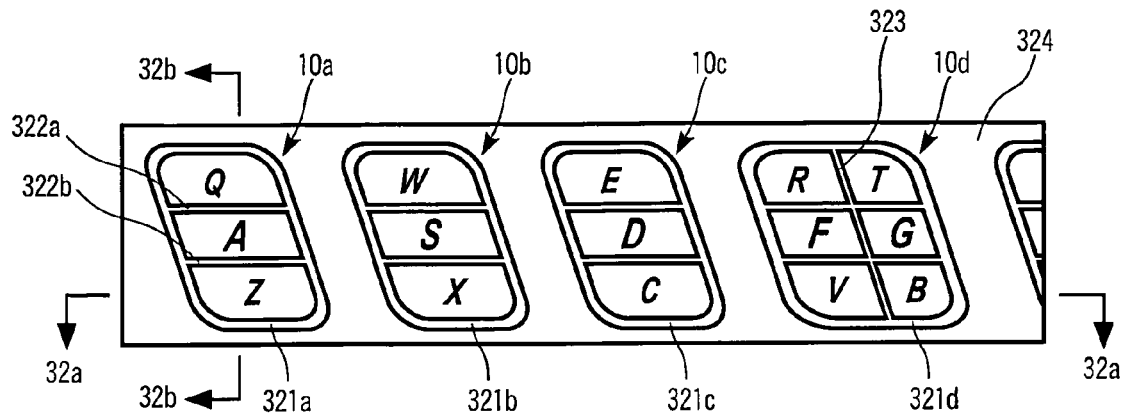
FIGS. 32, 32a, and 32b show a portion of a keyboard similar to FIG. 31 and including raised, topographical structure for delineating the keys and the activation positions thereof.
Figure 33:
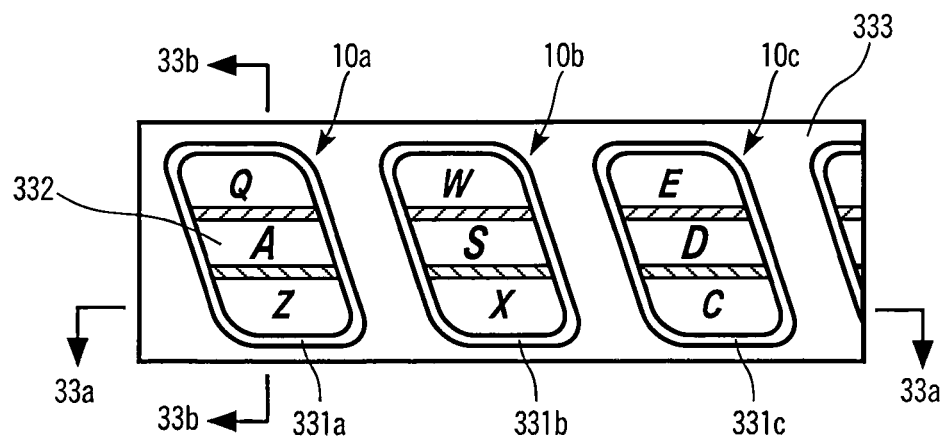
FIGS. 33, 33a, 33b show a portion of a keyboard similar to FIG. 31 and including both raised and recessed topographical structure for delineating the keys and activation positions thereof.

In this regard, FIGS. 31-33 show additional embodiments of the invention, implemented on a single continuous member having an upper, flat surface. Said surface can contain graphic images of the keys, surface features to delineate keys and/or activation positions within the keys, or a combination of the two. A variety of technologies can be used to detect finger location and movement on the surface, such as capacitive or optical sensing, as well as pressure sensitive transparent overlays on top of the surface. The member itself may be constructed of a flexible material, with sensors underneath to detect when the surface is deformed in response to finger pressure. In addition, haptic feedback can be incorporated to give the user a tactile verification of a key position activation.

Which character is being selected on a given key can be determined by analyzing the relative amounts of pressure or surface area covered by the finger on the respective activation positions of the key.

Figure 31A:
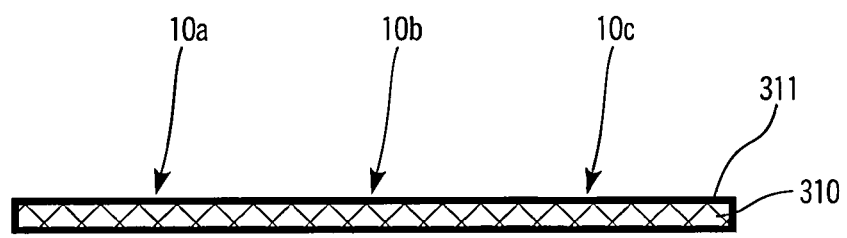

FIG. 31 shows an embodiment of the invention on a thin sheet member (310) including upper flat surface (311) where said surface is completely flat and has no topographical features. Keys 10*a*-10*c* from FIG. 1 are shown in this figure. FIG. 31*a* shows a cross-section of the surface (311). The keys can be a permanent graphic applied to the surface (311), or below the surface if the surface is transparent. The keys can also be "virtual," wherein they can appear on or below the surface (311) by means of a display device, such as a flat panel display commonly used in touch-screen computers and other devices. This would allow the keys to appear when keyboard input is desired, and to disappear when not needed to allow that space to be used for other display or input functions.

Without any surface features to allow the user's fingers to feel the locations of the keys, the embodiment in FIG. 31 would make it difficult, if not impossible, for the user to type without looking at the keys. This embodiment would allow the speed and efficiency touch typing affords, but would not offer the ability to type without looking at the keys, which is a key benefit of touch typing. FIGS. 32 and 33 show embodiments of the invention including a sheet member having a upper flat surface but where the surface also contains topographical features that enable the user's fingers to feel the locations of the keys and their respective activation positions, which would therefore allow the user to touch type without looking at the keys.

Figure 32A:
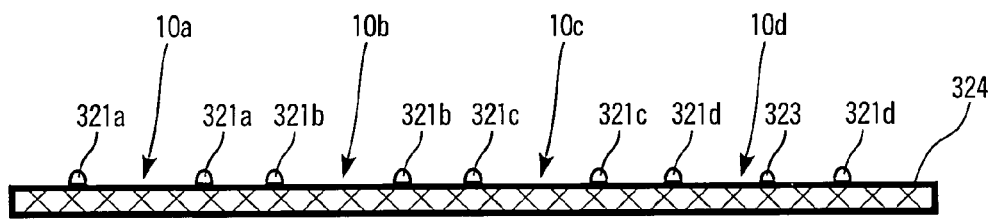

FIG. 32 shows an embodiment of the invention including a thin sheet member (320) having a flat upper surface (324) where the surface includes topographical structure to delineate the keys. Keys 10a-10d from FIG. 1 are shown in this figure. Each key has a raised outside perimeter border (321a-321d for keys 10a-10d, respectively). FIG. 32a shows a cross-sectional view of the raised perimeter borders (321a-321d).

Figure 32B:
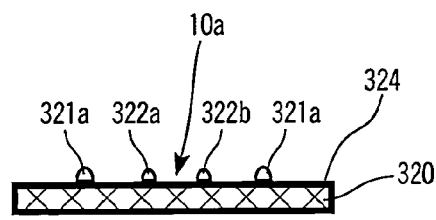

Each key also has an upper (322a) and lower (322b) raised horizontal border, which serve to delineate the key's different activation positions. The area between these two horizontal borders defines the center, or "home row," letter position(s). FIG. 32 shows the upper horizontal border (322a) and lower horizontal border (322b) for key 10a. FIG. 32b shows a cross-sectional view of the raised horizontal borders (322a and 322b) and the raised perimeter border (321a) of key 10a.

The 6-position keys may, optionally, also have an essentially vertical (parallel to the left and right outside borders of the keys) border (323) that further divides the keys into six topographically-defined regions corresponding to the keys' six activation positions. FIG. 32 shows this border (323) for the "RTFGVB" 6-position key 10d, and FIG. 32a shows the border (323) in cross-section.

Figure 33A:
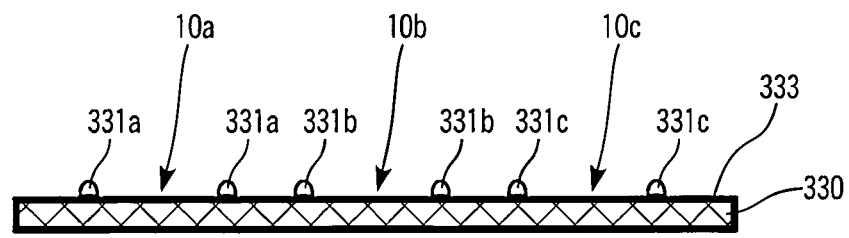

FIG. 33 shows an embodiment of the invention including a thin sheet member (330) having a flat upper surface (333) where the surface contains topographical structure to define the keys. Keys 10a-10c from FIG. 1 are shown in this figure. Each key has a raised outside perimeter border (331a-331c for keys 10a-10c, respectively). FIG. 33a shows a cross-sectional view of the raised perimeter borders (331a, 331b, and 331c).

Figure 33B:
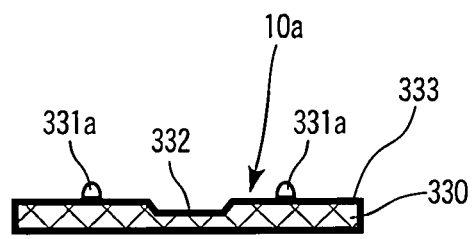

Each key also has a horizontal depression, or trough, corresponding to the center, or "home row," letter position (s). FIG. 33b shows a cross-sectional view of the trough (332) in key 10a.

The 6-position keys in this embodiment may also incorporate topographical features (a raised vertical border as shown in FIG. 32, troughs of different depths, etc.) to further divide the keys into six topographically-defined regions corresponding to the keys' six activation positions.

Figure 34:
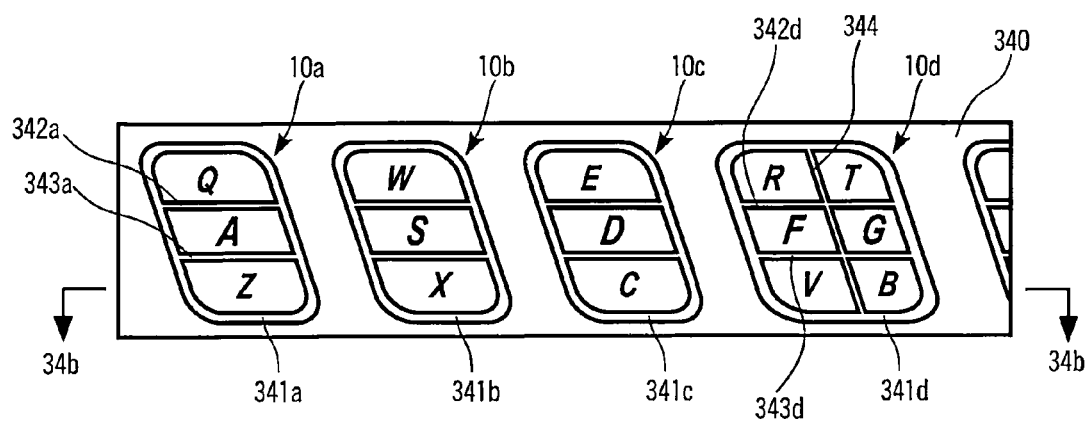
FIGS. 34, 34a, and 34b show a portion of a keyboard including keys having discrete, independently movable key elements that each correspond to a distinct activation position for a letter associated with the key element.

FIG. 34 shows an embodiment of the invention with raised perimeter and activation-position borders similar to those shown in FIG. 32, but with the difference being that each of the keys' activation positions defined by these borders is a separate, discrete, independently moveable key element. Keys 10a-10d from FIG. 1 are shown in this figure.

The key elements need not be separate and independently moveable from each other as in the keyboard of FIG. 34. Instead, what is important is that the key elements correspond to the activation positions for the letters of a key herein so that they are grouped together to be operated by a single finger. In this regard, the keys of the previously described embodiments are also considered herein to each be a group of key elements. To this end, with the keyboards described herein, the centers of laterally adjacent key elements in adjacent key element groups are provided with a predetermined intergroup spacing which corresponds to the standard interkey spacing on a standard size keyboard, i.e., approximately ¾", to permit easy touch typing therewith, whereas the spacing between centers of adjacent key elements within a group of key elements, is less than the predetermined intergroup spacing to allow for a reduction in size of the present keyboards over standard full-size keyboards.

As shown in FIG. 34, key element group 10a has three key elements in a generally single-columnar configuration with three activation positions corresponding to the letters QAZ defined by the three areas delineated by its perimeter (341a) and horizontal (342a and 343a) borders. These areas are shown in FIG. 34a as activation positions 345a, 345b and 345c for the letters Q, A and Z respectively.

Key element group 10d has six key elements in a side-by-side, generally double-columnar configuration with six activation positions corresponding to the letters RTFGVB defined by the six areas delineated by its perimeter (341d), horizontal (342d and 343d) and vertical (344) borders. These areas are shown in FIG. 34a as activation positions 346a, 346b, 346c, 346d, 346e and 346f for the letters R, T, F, G, V and B respectively.

Figure 34A:
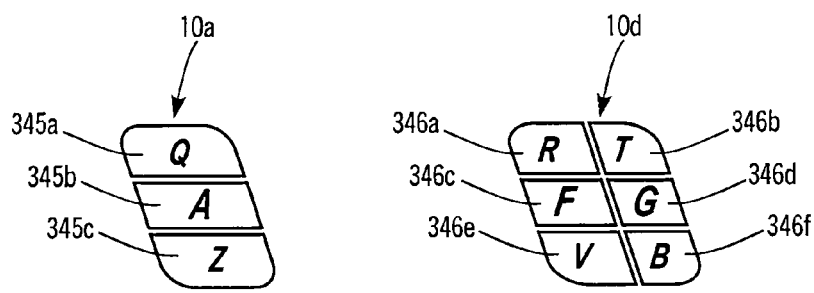

Each of the activation positions shown in FIG. 34a (345a-345c and 346a-346f) corresponds to a separate, independently moveable key element that can be pressed down by a user's finger. The cross-sectional view of FIG. 34b shows an example of how these individual activation position key elements can be used in conjunction with mechanical pushbutton switches (348a-348e) which are activated by a plunger (347) extending centrally downward from the bottom of the enlarged upper head of each T-shaped key element.

Figure 34B:
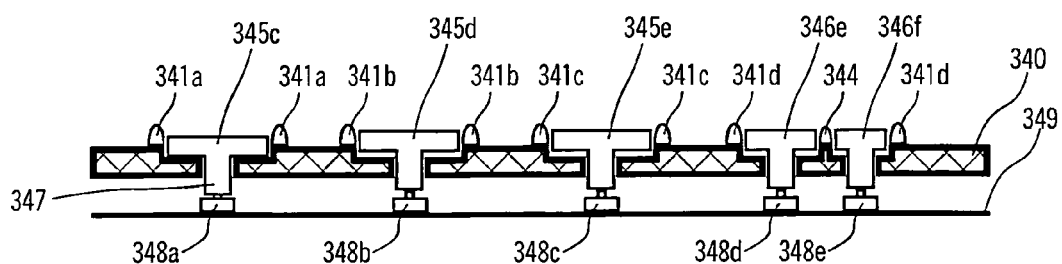

In FIG. 34b, activation positions 345c, 345d, 345e, 346e and 346f correspond to the letters Z, X, C, V and B, respectively, and have plungers which push down on pushbutton switches 348a-348e, respectively. These pushbutton switches are mounted on a support surface (349).

In FIG. 34b, the key element having the activation position for the letter Z (345c) is shown being pressed down by a user, which causes its plunger (347) to press down on the button of the pushbutton switch (348a) below it, which sends a signal indicating that the user is typing a "Z".

FIG. 34b shows just one example of different mechanical and/or electrical methods that may be used to cause a signal for a character to be output when the key element including its activation position is pressed down by a user.

Figure 35A:
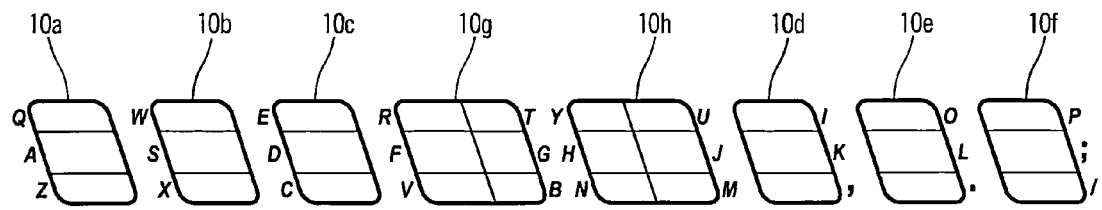
FIG. 35a shows keys 10a through 10h with the letters appearing along the sides of the keys rather than on the keys themselves.
Figure 35B:
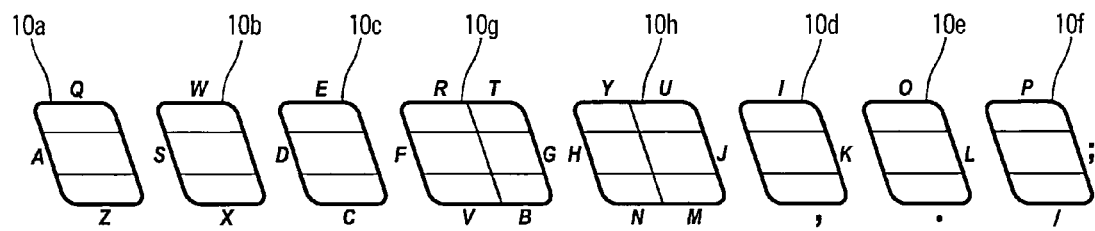
FIG. 35b shows keys 10a through 10h with the letters appearing along the sides, tops, and bottoms of the keys rather than on the keys themselves.
Figure 35C:
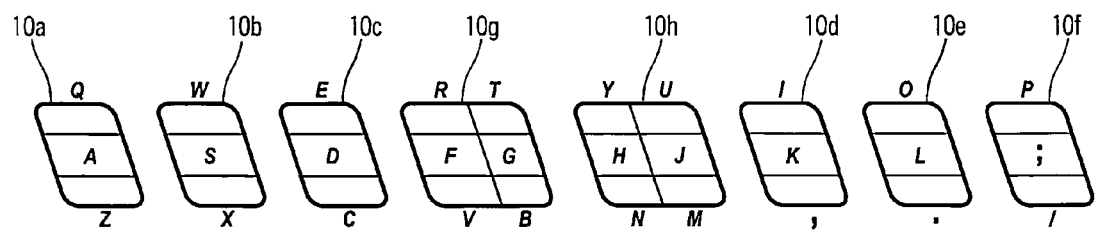
FIG. 35c shows keys 10a through 10h with the home row letters A, S, D, F, G, H, J, K, and L appearing on the keys, and the remaining letters appearing along the tops and bottoms of the keys.

Although embodiments in which the letters appear on the keys, such as keys 10a through 10h in FIG. 1, are the preferred embodiments of this invention, alternate embodiments are possible in which some or all of the letters can be associated with the keys and their activation positions yet appear in locations not on the keys themselves. FIGS. 35a, 35b and 35c show examples of such alternate embodiments.

FIG. 35a shows keys 10a though 10h with the letters appearing along the sides of the keys, each letter being proximate—and hence visually associated with—its respective activation position on its key. Thus, for the 3-position key 10a, the top position is the activation position for the letter Q, the center position is the activation position for the letter A, and the bottom position is the activation position for the letter Z. FIG. 16 shows a top face plate (161) which provides for separation of the keys and rigidity along the top surface of the keyboard. The letters shown in FIG. 35a could be located, for example, on such a top face plate.

Similarly, FIG. 35b shows keys 10a though 10h with the letters Q, W, E, R, T, Y, U, I, O, and P appearing above their respective activation positions; letters A, S, D, F, G, H, J, K, and L appearing to the side of their respective activation positions; and letters Z, X, C, V, B, N, and M appearing below their respective activation positions. The letter arrangement of FIG. 35c is the same as FIG. 35b but with the letters A, S, D, F, G, H, J, K, and L appearing on the keys rather than to the side of the keys.

Additionally, an alternate embodiment of this invention could have no visible letters appearing at all, similar to commercially available "learning" keyboards without visible letters that force a user to memorize the positions of the letters to enable touch typing without looking at the keyboard. Such an embodiment could be also used as an alternative to the chorded Braille keyboards, providing users the ease of use of one key per finger.

Having provided the disclosure of the illustrated embodiment, one skilled in the art may devise other embodiments and modifications which fall within the scope and sphere of the appended claims. In these further embodiments or modifications are deemed to be further embodiments of the present invention. The scope of the present invention is defined by the following claims.

The invention claimed is:

1. A keyboard for typing letters, the keyboard comprising:
   eight keys that include one or more activation positions on each key;
   predetermined multiple-position keys of the eight keys that include multiple activation positions thereon that are different from the other activation position or positions on the same multiple-position key; and
   a predetermined group of the keys' activation positions collectively corresponding to all the letters of a predetermined alphabet with the predetermined group of the keys' activation positions arranged in a predetermined standard touch-typing arrangement to allow for touch typing with the eight keys,
   wherein each activation position in the predetermined group of activation positions on each of the predetermined multiple-position keys corresponds to a different letter of the predetermined alphabet than the other activation position or positions on the same multiple-position key such that when touch typing therewith finger movements are substantially the same as used when touch typing on a standard keyboard having the same predetermined touch-typing arrangement but without requiring that any one of the user's fingers operate more than one of the keys for touch typing of the letters with the eight keys.

2. The keyboard of claim 1, wherein the letters of the predetermined alphabet are arranged on the keys in accordance with their respective activation positions on the keys.

3. The keyboard of claim 1, wherein the letters of the predetermined alphabet are arranged to provide a visual correspondence between each letter and its respective activation position on the keys.

4. The keyboard of claim 1 wherein the predetermined alphabet is English so that the predetermined standard touch-typing arrangement is a standard QWERTY arrangement.

5. The keyboard of claim 4 wherein the eight keys include seven multiple-position keys and one single-position key for the letter P.

6. The keyboard of claim 1 wherein the predetermined alphabet is German so that the predetermined standard touch-typing arrangement is a standard QWERTZ arrangement.

7. The keyboard of claim 1 wherein the predetermined alphabet is French so that the predetermined standard touch-typing arrangement is a standard AZERTY arrangement.

8. The keyboard of claim 1, wherein at least one of the eight keys has at least one activation position that corresponds to a non-letter character in addition to the other activation position or positions on that same key that correspond to a letter or letters, respectively.

9. The keyboard of claim 1, wherein at least one of the eight keys has at least one activation position that corresponds to a non-letter character in addition to the other activation position or positions on that same key that correspond to a letter or letters, respectively, and
   additional keys in addition to the eight keys for non-character typing functions.

10. The keyboard of claim 1, wherein the keys are arranged in a horizontal row.

11. The keyboard of claim 10, wherein the predetermined alphabet comprises the English alphabet, the predetermined standard touch-typing arrangement is a QWERTY arrangement, the fourth of said multi-position keys from the right-hand side activates at least the letters U, Y, J, H, M, and N, and the fourth of said multiple-position keys from the left-hand side activates at least the letters R, T, F, G, V, and B.

12. The keyboard of claim 1 wherein the eight keys include a first group of 5, three-position keys, a second group of 2, six-position keys, and one key having between three and six different activation positions.

13. The keyboard of claim 12 wherein the keys are arranged in a horizontal row, from left to right, as follows:
   3, three-position keys; followed by
   2, six-position keys; followed by
   2, three-position keys; and followed by
   1, three- to six-position key.

14. The keyboard of claim 12, wherein at least one of the eight keys has at least one activation position that corresponds to a non-letter character in addition to the other activation position or positions on that same key that correspond to a letter or letters, respectively.

15. The keyboard of claim 14, wherein the predetermined alphabet is English, the predetermined standard touch-typing arrangement is a QWERTY arrangement, and the keys are arranged in a horizontal sequence, from left to right, as follows:
   1, three-position key corresponding to the letters Q, A, and Z; followed by
   1, three-position key corresponding to the letters W, S, and X; followed by
   1, three-position key corresponding to the letters E, D, and C; followed by
   1, six-position key corresponding to the letters R, T, F, G, V, and B; followed by
   1, six-position key corresponding to the letters Y, U, H, J, N and M; followed by
   1, three-position key with positions corresponding to the letters I and K; followed by
   1, three-position key with positions corresponding to the letters O and L; followed by
   1, three- to six-position key with one position corresponding to the letter P.

16. The keyboard of claim 1 wherein the predetermined alphabet comprises the English alphabet, the predetermined standard touch-typing arrangement comprises a QWERTY typing arrangement, and the multiple-position keys each have only one, two, three or six activation positions thereon that correspond to letters to allow each of a user's fingers to touch type the same letters with the multiple multiple-position keys as when touch typing on a standard QWERTY keyboard without requiring any finger to operate more than one of the eight keys.

17. The keyboard of claim 1, wherein the eight keys including the multiple-position keys each include actuation mechanisms configured such that for all the letters of the predetermined alphabet, typing a letter always requires only a single finger motion upon that letter's key;
   wherein the single finger motion consists of applying a downward pressure upon the activation position corresponding to the letter; and
   wherein said finger motion upon said key produces a unique signal for the letter corresponding to the activation position upon which the pressure is applied.

18. The keyboard of claim 1 wherein the keys each have a perimeter edge extending thereabout, and the letters of the predetermined alphabet are arranged off of the keys but adjacent to the perimeter edges thereof and their activation positions thereon.

19. The keyboard of claim 1 wherein the keys each have a perimeter edge extending thereabout, and the letters of the predetermined alphabet are arranged so that predetermined ones of the multiple-position keys that each have multiple activation positions that correspond to multiple letters have at least one letter arranged on the key in accordance with the activation position thereof and at least one letter arranged off the key but adjacent to the perimeter edge thereof and the corresponding activation position thereon.

20. A reduced size keyboard for touch typing letters, the reduced size keyboard comprising:
   eight keys which collectively include all the letters of a predetermined alphabet thereon to permit all of the letters to be accessed by eight fingers of a user without having to operate more than one of the keys with any one finger; and
   a predetermined standard touch-typing arrangement of the letters on the eight keys with the letters generally assigned to three rows across the eight keys and predetermined ones of the keys having multiple letters arranged in a generally columnar arrangement thereon,
   wherein typing any one of the letters always requires only a single finger motion upon the key on which the one letter is located consisting of a downward pressure upon that letter's location on the key so that the keys including multiple letters thereon allow the user's fingers to move or direct an actuation force on the multiple-letter keys in a manner generally corresponding to finger movements used for touch typing on a standard keyboard having the same predetermined standard touch-typing arrangement without requiring that any one of the user's fingers operate more than one of the keys for touch typing of the letters with the eight keys, and
   wherein at least one of the eight keys has at least six letters thereon.

21. The keyboard of claim 20 wherein the predetermined alphabet is English so that the predetermined standard touch-typing arrangement is a standard QWERTY arrangement.

22. The keyboard of claim 20 wherein the predetermined alphabet is German so that the predetermined standard touch-typing arrangement is a standard QWERTZ arrangement.

23. The keyboard of claim 20 wherein the predetermined alphabet is French so that the predetermined standard touch-typing arrangement is a standard AZERTY arrangement.

24. The keyboard of claim 20, wherein at least one of the eight keys has a non-letter character in addition to one or more letters thereon.

25. The keyboard of claim 24, including additional keys in addition to the eight keys for non-character typing functions.

26. The keyboard of claim 20, wherein the keys are arranged in a horizontal row.

27. The keyboard of claim 20 wherein the eight keys are divided into two groups of four keys with each group extending along either a curved or straight line.

28. The keyboard of claim 27 wherein each group of four keys extends along a straight line with the straight lines for each group being oblique to each other.

29. The keyboard of claim 27 wherein each group of four keys extends along a curved line with the curved lines being different from one another.

\* \* \* \* \*